US007861288B2

(12) United States Patent
Tsuruoka et al.

(10) Patent No.: US 7,861,288 B2
(45) Date of Patent: Dec. 28, 2010

(54) USER AUTHENTICATION SYSTEM FOR PROVIDING ONLINE SERVICES BASED ON THE TRANSMISSION ADDRESS

(75) Inventors: Yukio Tsuruoka, Tokyo (JP); Yoshinao Kikuchi, Saitama (JP); Shintaro Mizuno, Tokyo (JP); Kenji Takahashi, Tokyo (JP); Kei Karasawa, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1008 days.

(21) Appl. No.: 10/534,541

(22) PCT Filed: Jul. 12, 2004

(86) PCT No.: PCT/JP2004/009944

§ 371 (c)(1), (2), (4) Date: May 10, 2005

(87) PCT Pub. No.: WO2005/011192

PCT Pub. Date: Feb. 3, 2005

(65) Prior Publication Data

US 2006/0048212 A1 Mar. 2, 2006

(30) Foreign Application Priority Data

Jul. 11, 2003 (JP) ............................ 2003-273445

(51) Int. Cl.
*H04L 29/06* (2006.01)

(52) U.S. Cl. ........................................ 726/10; 713/156

(58) Field of Classification Search ................. 370/352; 380/277; 709/204, 219, 223, 225, 227, 229; 713/168; 726/3, 5
See application file for complete search history.

(56) References Cited

U.S. PATENT DOCUMENTS 6,263,432 B1 * 7/2001 Sasmazel et al. ............ 713/100

(Continued)

FOREIGN PATENT DOCUMENTS

JP 5-333775 12/1993

(Continued)

OTHER PUBLICATIONS

J. Kohl, C. Neuman: Network Working Group Request for Comments: 1510, Sep. 1993.

(Continued)

*Primary Examiner*—William R Korzuch
*Assistant Examiner*—Michael R Vaughan
(74) *Attorney, Agent, or Firm*—Oblon, Spivak, McClelland, Maier, & Neustadt, L.L.P.

(57) ABSTRACT

An address allocated to a user by an authentication server is used as an IP address of a packet which is transmitted from a user terminal, preventing an illicit use if the IP address were eavesdropped. An authentication server 100 performs an authentication of a user based on a user authentication information which is transmitted from the user terminal, and upon a successful authentication, allocates an address to the user terminal, and issues a ticket containing the address to be returned to the user terminal. The user terminal sets up the address contained in the ticket as a source address, and transmits the ticket to the application server 300, requesting a session to be established. After verifying that the ticket is authentic, the server 300 stores the ticket and establishes a session with the user terminal. The user terminal transmits a service request packet containing the source address to the server 300 utilizing the session. If the source address coincides with the address contained in the stored ticket, the server 300 provides a service to the user.

11 Claims, 18 Drawing Sheets

U.S. PATENT DOCUMENTS

| | | | | |
|---|---|---|---|---|
| 6,460,141 | B1 * | 10/2002 | Olden | 726/4 |
| 6,948,074 | B1 * | 9/2005 | Borella et al. | 726/14 |
| 7,233,997 | B1 * | 6/2007 | Leveridge et al. | 709/229 |
| 7,243,366 | B2 * | 7/2007 | Medvinsky et al. | 726/2 |
| 7,266,685 | B1 * | 9/2007 | Meandzija et al. | 713/156 |
| 7,370,194 | B2 * | 5/2008 | Morais et al. | 713/153 |
| 7,401,216 | B2 * | 7/2008 | Arkko et al. | 713/153 |
| 7,451,312 | B2 * | 11/2008 | Medvinsky et al. | 713/168 |
| 2002/0026590 | A1 * | 2/2002 | Kusunoki | 713/201 |
| 2003/0063594 | A1 * | 4/2003 | Li et al. | 370/342 |
| 2003/0063750 | A1 * | 4/2003 | Medvinsky et al. | 380/277 |
| 2003/0163693 | A1 * | 8/2003 | Medvinsky | 713/169 |
| 2003/0172269 | A1 * | 9/2003 | Newcombe | 713/168 |
| 2004/0008676 | A1 * | 1/2004 | Thomas | 370/389 |
| 2004/0010619 | A1 * | 1/2004 | Thomas | 709/245 |
| 2004/0196981 | A1 * | 10/2004 | Nakano et al. | 380/280 |
| 2005/0114653 | A1 * | 5/2005 | Sudia | 713/158 |

FOREIGN PATENT DOCUMENTS

| | | |
|---|---|---|
| JP | 09-330284 | 12/1997 |
| JP | 2002-207929 | 7/2002 |
| JP | 2003-066836 | 3/2003 |
| JP | 2003-108517 | 4/2003 |
| WO | WO 01/67708 A2 | 9/2001 |
| WO | WO 03/007571 A1 | 1/2003 |
| WO | WO 03/055170 A1 | 7/2003 |
| WO | WO 03055170 A1 * | 7/2003 |

OTHER PUBLICATIONS

S. Kent, R. Atkinson: Network Working Group Request for Comments: 2401, Nov. 1998.

B. Aboba, L. Blunk, J. Vollbrecht, J. Carlson, H. Levkowetz, Ed.: Network Working Group Request for Comments: 3748, Jun. 2004.

* cited by examiner

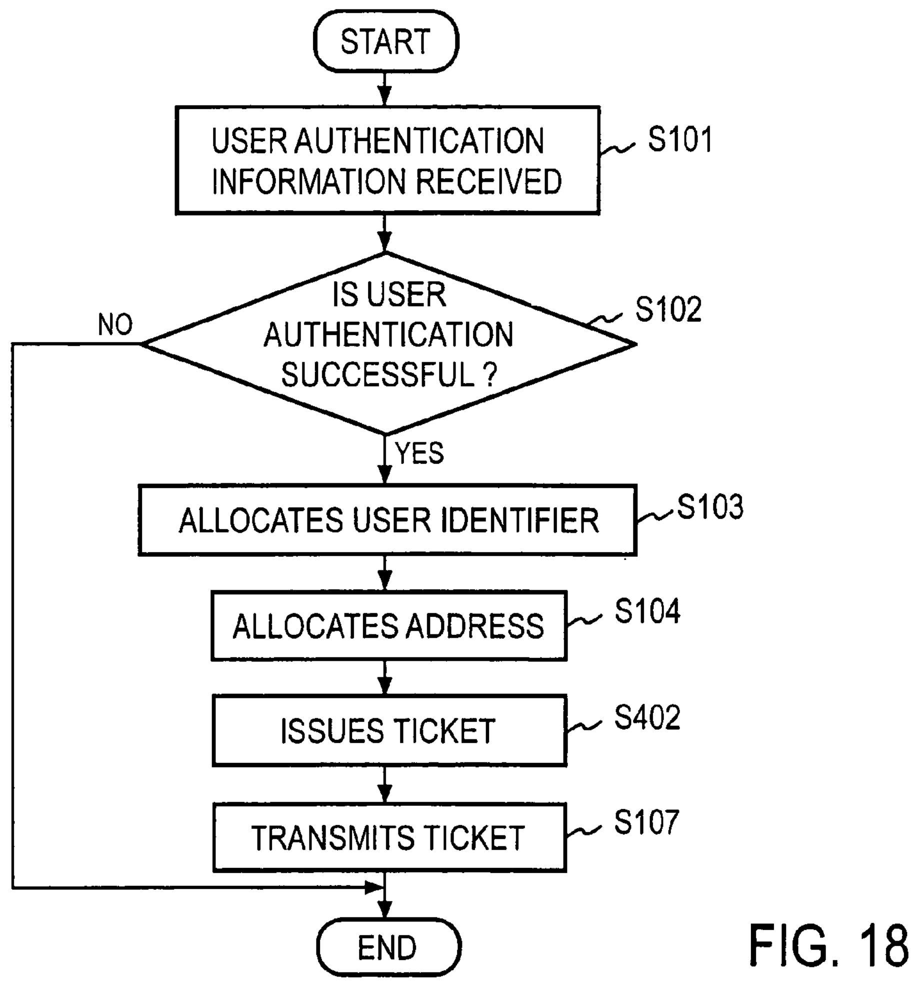
FIG. 18
FIG. 19A
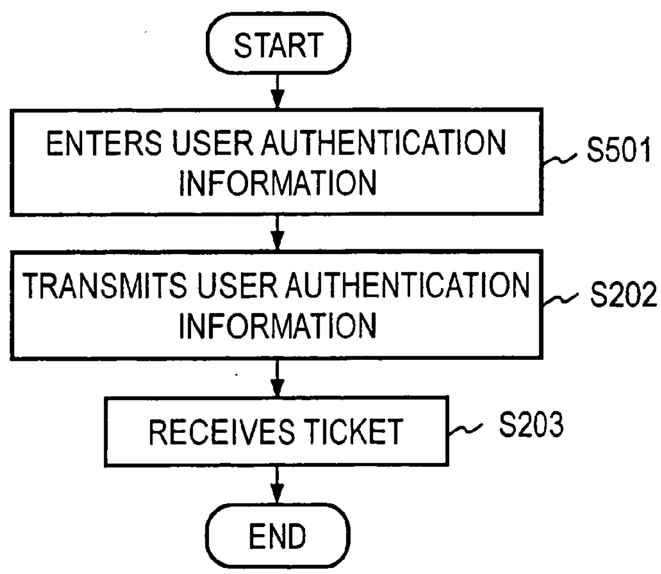
FIG. 19B
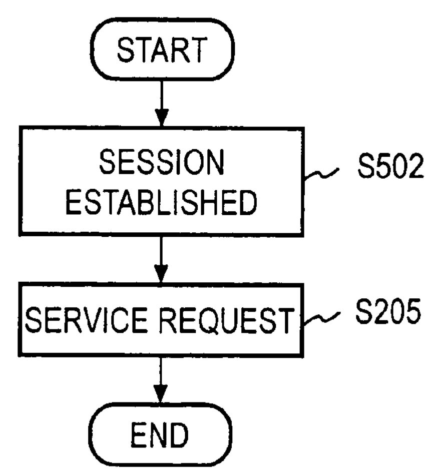

USER AUTHENTICATION SYSTEM FOR PROVIDING ONLINE SERVICES BASED ON THE TRANSMISSION ADDRESS

BACKGROUND OF THE INVENTION

1. Field of the Invention

The present invention relates to an authentication system for a user terminal to receive a user authentication from an authentication server and to request a service offered by an application server on the basis of the authentication received, and in particular, to an authentication system in which upon a successful user authentication, the authentication server allocates a source address to the user terminal and the user requests a service offered by the application server using the allocated source address, and an apparatus and a program therefor.

2. Description of the Related Art

When a user desires to obtain a service from a server through a network such as the internet, it is a general practice that a session be established between the terminal of the user (the user terminal) and the server and that a service request is sent to the server through the session. For the sake of charging for the service offered by the server, the latter requires a user authentication before the service is offered, and upon successful authentication, it offers the service through the established session. Thus, the user authentication takes place each time a service request to the server is made, and the service is offered through the established session. If the service offered covers a plurality of packets, the service is offered through the same session.

In view of an increased throughput experienced by each application server if a user authentication is performed in response to each service request, there is proposed a method in which a user authentication is performed by an authentication server, which upon successful authentication, allocates an IP address to the user, who then requests the server for a service to be offered using the IP address as a source address.

In the prior art network authentication system, such an address based authentication method as indicated below is disclosed in patent literature1, for example. Specifically, when a user utilizes a connection service, a network access authentication server refers to a personal information database in which a correspondence between a customer information and a user ID (information which uniquely identifies a user) is pre-stored in order to authenticate the user, and upon successful authentication, allocates an IP (Internet Protocol) address to the user's terminal together with a connection grant, transmits the allocated IP address to the user terminal while concurrently storing the relationship between the IP address and the user ID in a storage, and when utilizing a commercial transaction service, the user terminal proposes a purchase of goods to a sales service provider apparatus on the internet using the IP address transmitted from the network access authentication server, the sales service provider address obtains the source IP address of a goods purchase proposal packet and sends this IP to the network access authentication server for inquiry and acquires the user ID on the basis of the IP address and then acquires the customer information which corresponds to the acquired user ID for purpose of authenticating the customer.

Patent literature 1: JP Application Kokai Publication No. 2002-207929

BRIEF SUMMARY OF THE INVENTION

However, the prior art authentication system mentioned above presents a problem that during the network access authentication of the user or while the service is being provided, a third party may eavesdrop the IP address used by the user from the packet which is transmitted or received on the network to enable impersonation by accessing the server which provides the commercial transaction service. In other words, the prior art address based authentication system cannot guarantee the authenticity of the address allocated to the user. It is to be noted that an authentic address refers to an address which an organization such as ISP (internet service provider) allocates to a user or user terminal according to a correct procedure.

It is an object of the present invention to provide an address based authentication system, an apparatus and a program therefor which can guarantee the authenticity of an address allocated to a user in order to overcome such a problem of the prior art.

In accordance with the present invention, in an authentication system in which an authentication server which authenticates a user, a user terminal which transmits a user authentication information and an application server which provides a service to a user through the user terminal are connected together in a manner to permit a communication therebetween;

the authentication server authenticates a user on the basis of user authentication information transmitted as an authentication request from the user terminal by utilizing authentication means, and upon a successful authentication of the user, allocates an address to the user terminal by an address allocation means, issues a ticket including the allocated address by a ticket issuing means and transmits the issued ticket to the user terminal;

the user terminal transmits the user authentication information to the authentication server, receives the ticket transmitted from the authentication server, sets up the address contained in the ticket as a source address for a packet which is transmitted from the user terminal by a source address set-up means, transmits a packet including the ticket to the application server, and transmits a packet which represents a request for a service to the application server by a service request means;

and the application server stores the ticket transmitted from the user terminal in a ticket memory means, determines by an address comparison means whether or not the source address of the packet representing a request for a service which is transmitted from the user terminal coincides with the address contained in the ticket stored in the ticket memory means, and upon determining that the addresses coincide, transmits a packet which provides a service to the user to the user terminal by a service providing means.

With the described arrangement, the authentication of a user and the allocation of an address are performed by the same authentication server and accordingly, it is assured that an address be allocated only to a valid user. Since the same authentication server performs the allocation of an address and an issuing of a ticket, the authenticity of the address can be guaranteed by the ticket.

Since the address is issued on the basis of the user authentication, the authenticity of the address can be guaranteed. In addition, the transmission of the ticket to the application server takes place only once, and since the address contained in this ticket is one which is given by the authentication server to the user terminal for which the valid user has just requested its authentication and since the address in this ticket is treated as the source address, it follows that if the source address of each service request packet which is transmitted from the user terminal through the session which is established for the transmission of the ticket coincides with the address contained in the stored ticket, that packet can be regarded as the packet from the authenticated user. Thus, the source address of the service request packet is associated with the authenticated user through the address contained in the ticket which is sent only once during the time the session is established. If a third party eavesdrops the source address of the service request packet and uses it to make a service request to the application server, the address contained in the stored ticket cannot coincide with the source address during that session, preventing a service from being provided.

BRIEF DESCRIPTION OF THE DRAWINGS

FIG. 18 is a flow chart showing an exemplary flow of processings by the authentication server according to the second mode for carrying out the present invention;

FIG. 19A is a flow chart showing an exemplary flow of processings which occur in the user terminal during the user authentication according to the second mode for carrying out the present invention;

FIG. 19B is a flow chart showing an exemplary flow of processings during a service request;

DETAILED DESCRIPTION OF THE INVENTION

Figure 1:
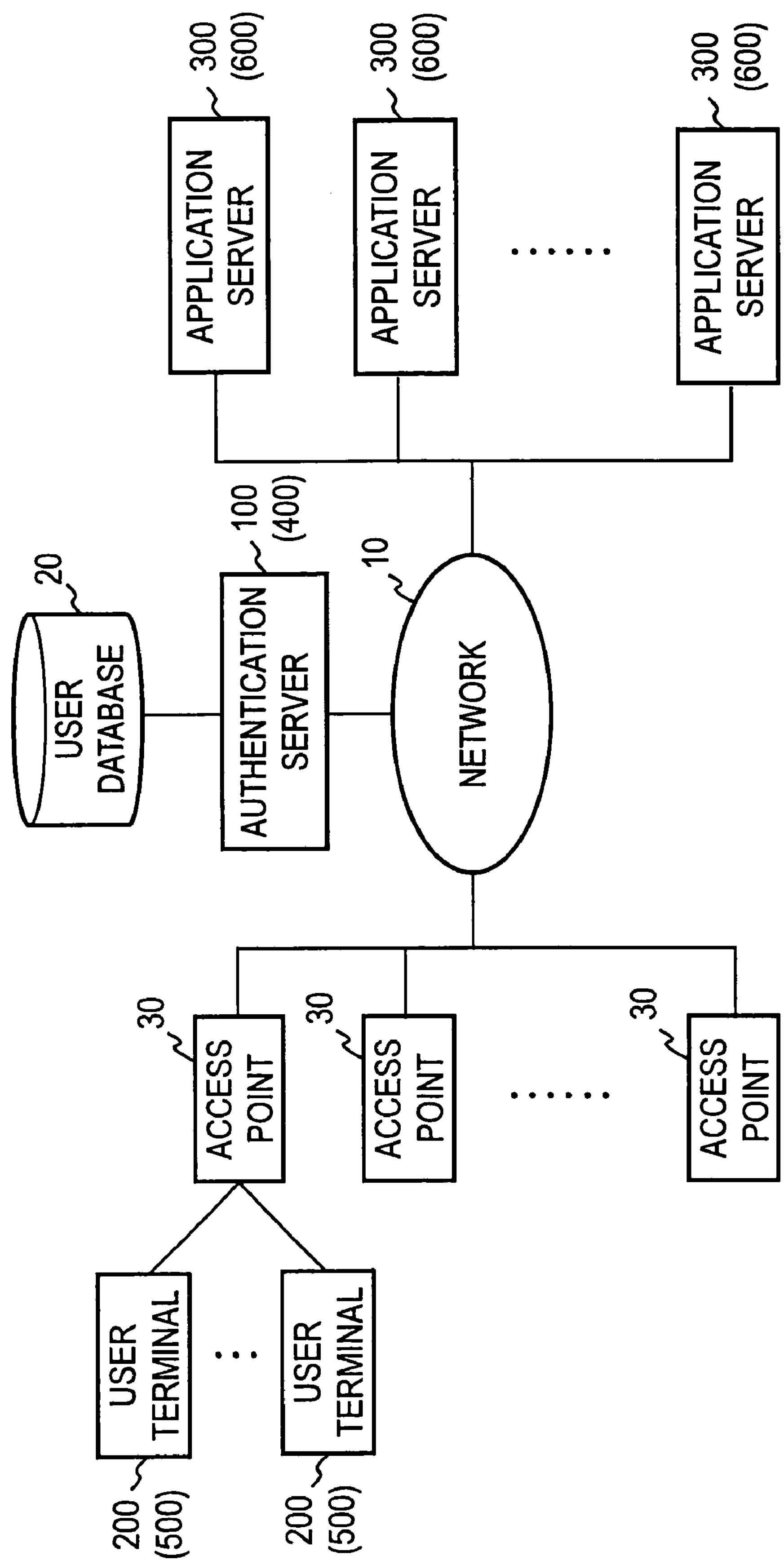
FIG. 1 is a block diagram showing an exemplary system arrangement of an authentication system according to a first and a second mode for carrying out the present invention.

Several modes for carrying out the present invention will now be described in detail with reference to the drawings. In the description to follow, corresponding parts are designated by the same reference characters while avoiding a duplicate description.

[First Mode] System Arrangement

FIG. 1 is a view of a system arrangement of an address based authentication system according to the first mode for carrying out the present invention. The address based authentication system according to the present invention comprises an authentication server 100 which authenticates a user, an access point 30 which covers a plurality of user terminals 200 which transmit user authentication information, and a plurality of application servers 300 which transmit a packet which provides a service to the user to the user terminals 200, all of which are connected together in a manner to permit a communication therebetween through a network 10.

The authentication server 100 is connected with a user database 20 which stores information relating to users (user authentication data). A user is not limited to a user which operates a user terminal 200, but may also be a program itself which acts as an operator, for example, which may appear as if a user is utilizing a user terminal during the execution of a program in a computer. The address based authentication system may be arranged such that the security of the network between the user terminals 200 and the application servers 300 is physically secured. In this instance, there is no need for a processing which confirms whether or not a packet transmitted from the user terminal 200 to the application server 300 is forged.

The network 10 may comprise a wireless or wired network, LAN (Local Area Network) or the internet. The access point 30 may be provided for each given area. The user terminal 200 may comprise a cell phone, hand set, personal appliance or a personal computer which is capable of a wireless communication. The application server 300 may comprise a server which provides a contents distribution service including a movie and sports programs, an electronic commercial transaction service, a communication service for electronic mail, IP telephone and instant messaging, or information browser service such as World Wide Web. In addition, the application server 300 may also comprise a gateway server or a firewall which provides an access to services on a separate network.

The user terminal 200 requests an authentication of a user by transmitting user authentication information which is required to have the user authenticated by the authentication server 100 through the access point 30. In this mode of carrying out the invention, the user authentication information includes at least one of a user identifier and a password, information generated on the basis of a key pair in order to authenticate a user, biometrics of a user (for example, fingerprint, iris, vein pattern, holograph, voice print, or the like), and other information used in known various technologies of user authentication. It will be noted that a key pair represents a pair of an public key and a private key which are based on the public key cryptography.

The authentication server 100 authenticates a user by referring to the user database 20 on the basis of user authentication information which is transmitted from the user terminal 200, and upon a successful authentication of the user, allocates a user identifier which corresponds to the user, and allocates an address which is capable of uniquely identifying a user terminal which corresponds to the allocated user identifier, issues a ticket including the allocated address and user identifier, and transmits the issued ticket to the user terminal 200.

The user terminal 200 uses the address contained in the ticket transmitted from the authentication server 100 as a source address for a packet which is transmitted from the user terminal 200, and initially transmits the ticket to the application server 100, followed by transmitting a packet which requests a service (hereafter referred to as a service request packet).

The application server 300 stores the ticket transmitted from the user terminal 200, determines whether or not the address contained in the stored ticket coincides with the source address of the service request packet, and upon determining a coincidence of the addresses, transmits a packet which provides a service to the user to the user terminal 200.

[First Mode] Authentication Server

Figure 2:
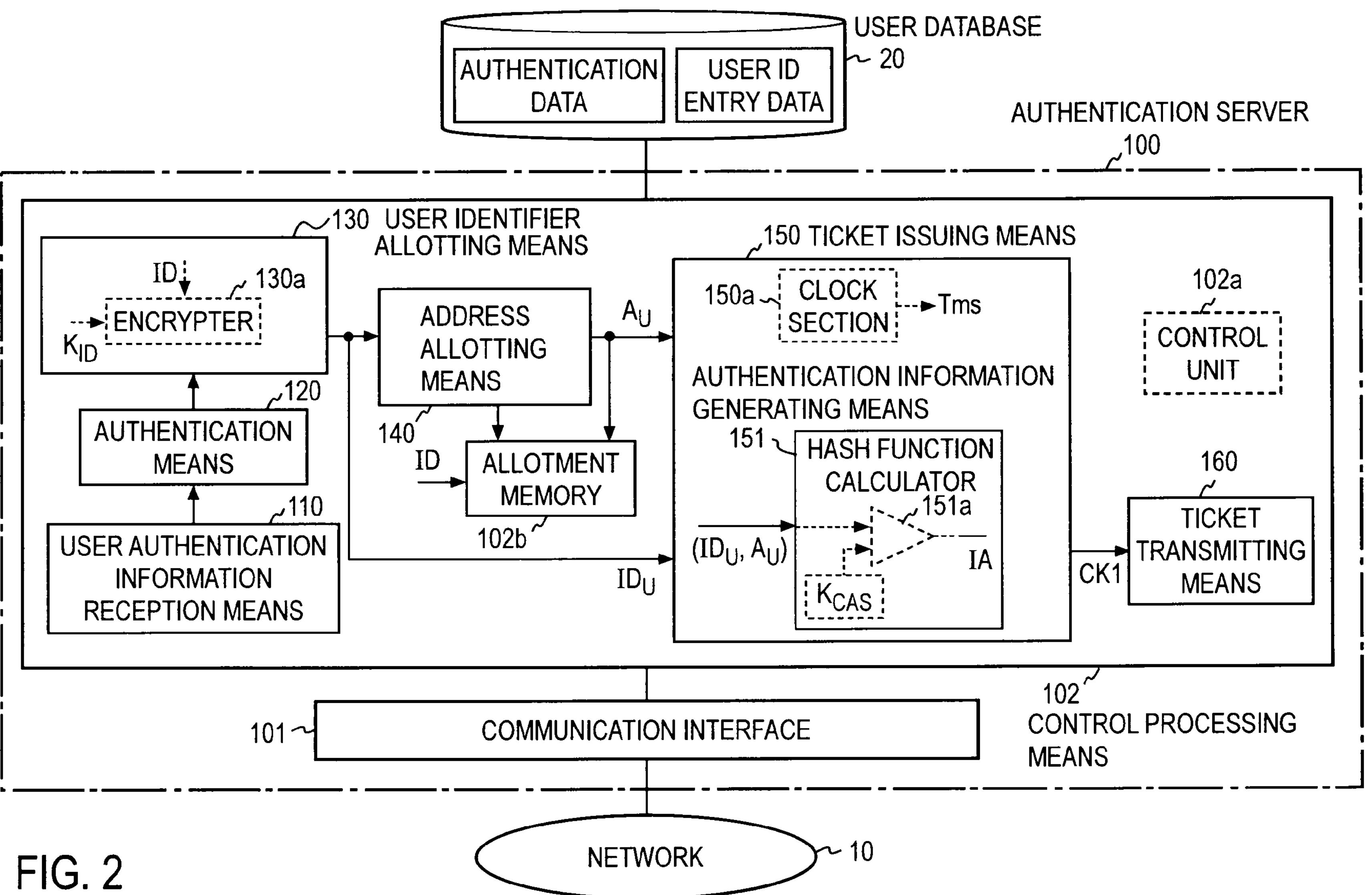
FIG. 2 is a block diagram showing an exemplary functional arrangement of an authentication server according to the first mode for carrying out the present invention.

FIG. 2 is a block diagram of an authentication server which is used in the first mode for carrying out the invention. The authentication server 100 comprises a communication interface 101 and control processing means 102. The communication interface 101 may comprise a modem or LAN interface, for example, and any means may be used to construct it provided it enables a communication with a communication equipment connected with the network 10.

The control processing means 102 comprises a control unit 102*a* including a CPU (Central Processing Unit) which executes a program, a memory which stores the program and the like, user authentication information reception means 110, authentication means 120, a user identifier allocating means 130, an address allocating means 140, a ticket issuing means 150 and a ticket transmitting means 160. It should be understood that these means need not be constructed as hardwares, but may function by the execution of a program.

The authentication server 100 mentioned above is connected to a user database 20 which stores information relating to users, and the user database 20 has user ID entry data in storage which includes authentication data which is used when authenticating a user and a user ID's (such as a name or information which uniquely identifies a user by itself).

The user authentication information reception means 110 receives an authentication request inclusive of user authentication information which is transmitted form the user terminal 200 through the communication interface 101.

The authentication means 120 performs an authentication of a user on the basis of user authentication information of the authentication request which is received by the user authentication information reception means 110. The authentication means 120 authenticates a user by verifying a consistency between the user authentication information and the authentication data stored in the user database 20.

Upon a successful authentication of a user, the user identifier allocating means 130 allocates a user identifier $ID_U$ corresponding to that user in response to the authentication request. It is to be understood that a user identifier is a unique identifier in the address based authentication system. Alternatively, the user identifier $ID_U$ may be an expandable one which fulfils the uniqueness globally such as "A@B" where A represents a unique identifier within the authentication server and B a global IP address of the authentication server. Thus, the user identifier corresponds to a user uniquely in a set of assumed users. However, a single user may correspond to a plurality of user identifiers concurrently.

The user identifier allocating means 130 acquires a user ID from user ID entry data which is stored in the user database 20, for example, and allocates the acquired user ID as a user identifier $ID_U$ in response to the authentication request. Alternatively, the user identifier allocating means 130 may generate a random number in an encryption means 130*a* when it has acquired a user ID, add the generated random number to the acquired user ID, and a resulting (random number+user ID) information may be further encrypted with an identifier generating secret key $K_{ID}$ of the authentication server 100 to be allocated as a user identifier $ID_U$. When arranged in this manner, only a person who knows the identifier generating secret key, for example the authentication server 100 is in a position to know the user ID on the basis of the user identifier $ID_U$, whereby the privacy protection of the user can be realized even though the user identifier $ID_U$ is contained in a ticket to be transmitted to the application server. As a further alternative, the user identifier allocating means 130 may allocate a user identifier $ID_U$ from the user authentication information or may choose something from random numbers, characters, a sequence number, which can be uniquely associated with the user ID by the database.

An address allocating means 140 allocates an address $A_U$ to a user terminal which corresponds to the user identifier $ID_U$ which is allocated by the user identifier allocating means 130. This address $A_U$ may be an IP address and in addition may be a mail address, URI (Uniform Resource Identifier) used in SIP (Session Initiation Protocol) or an addressee of IM (Instant Messaging).

If it can be assumed that during the address allocation by the address allocating means 140, a correspondence of a same address to a plurality of user identifiers simultaneously cannot occur, one address uniquely corresponds to a user identifier and also uniquely corresponds to a user.

In order to allow a correspondence between the user identifier $ID_U$ allocated to the authenticated user and the allocated address $A_U$ to be readily recognizable, such correspondence or a ticket itself which contains such correspondence information is stored in an allocation memory 102*b* or in association with user information contained in the user database 20. The user identifier $ID_U$ and the address $A_U$ which are allocated to the same user may be changed each time an authentication request is made. For this reason, tickets for the same user are distinguished according to the date and the time when the tickets have been issued. User identifiers $ID_U$ and addresses $A_U$ which fall into disuse are deleted at suitable times. In this manner, an accommodation is made to answer an inquiry from the application server 300 about the user information or to charge for the service provided, on the basis of the user identifier $ID_U$.

Ticket issuing means 150 includes authentication information generating means 151 in this example, temporarily generating a provisional ticket ($ID_U$, $A_U$) containing the user identifier $ID_U$ allocated by the user identifier allocating means 130 and the address $A_U$ allocated by the address allocating means 140, generating authentication information IA on the basis of the provisional ticket by the authentication information generating means 151, and issuing a ticket CK1 containing the authentication information IA, the user identifier $ID_U$ and the address $A_U$.

Figure 5:
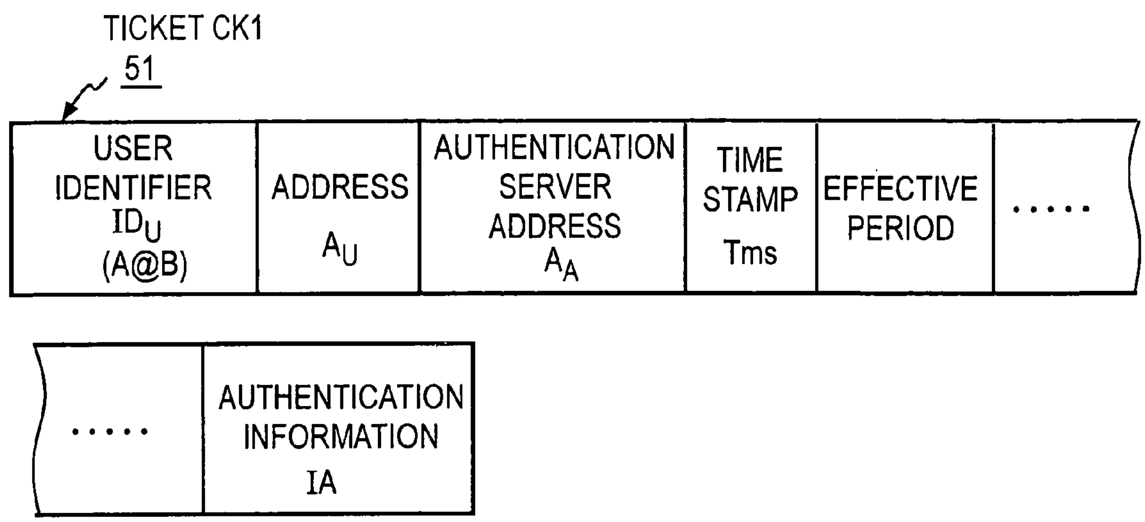
FIG. 5 is a view showing an example of construction of a ticket used in the first mode for carrying out the present invention.

As illustrated in FIG. 5, the ticket CK1 consists of the user identifier, the address, authentication information and in addition, a time stamp representing the date and time when the ticket CK1 has been issued, information representing an effective period of the ticket, and while not shown in FIG. 5, information representing a communication band width allocated to the user terminal 200, and information relating to the access point 30 which covers the user terminal 200, for example, positional information or the like. When the time stamp is contained, the ticket issuing means 150 includes a clock section 150*a*, and a time stamp delivered from the clock section 150*a* is utilized. Information representing the effective period of the ticket and the information representing the communication band width allocated to the user terminal 200 may be previously determined by a contract between the user who uses the user terminal 200 and application service providers or a communication enterprise which operate the access points 30, the authentication server 100 and the application servers 300.

In addition, an authentication server identification information (for example, address $A_A$) which uniquely identifies the authentication server 100 may be contained in the ticket CK1 as shown in FIG. 5, for example. Alternatively, where the identifier A which is unique within the authentication server 100 and the global IP address of the authentication server 100 are combined into the form "A@B" to be used as the user identifier $ID_U$, as mentioned previously, this B may be used as the authentication server identification information, as indicated in FIG. 5.

The authentication information generating means 151 inputs a shared secret key $K_{CAS}$ which is shared beforehand with the application server 300 and the provisional ticket ($ID_U$, $A_U$), then calculates one-way hash function with respect to the provisional ticket using the shared secret key $K_{CAS}$ to generate a authenticator MAC (message authentication code), which is delivered as authentication information IA.

The ticket transmitting means 160 transmits the ticket 51 issued by the ticket issuing means 150 to the user terminal 200 through the communication interface 101.

[First Mode] User Terminal

Figure 3:
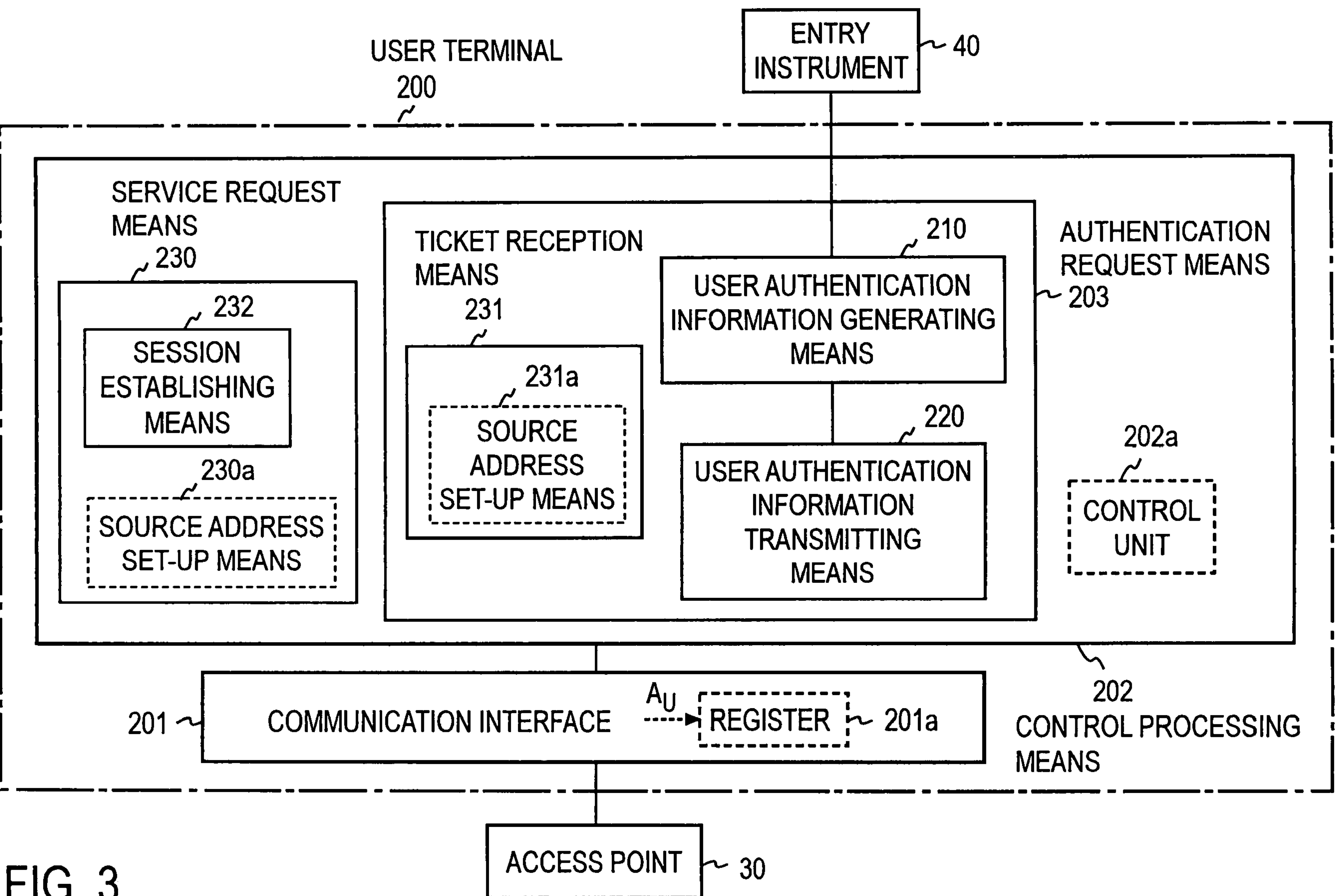
FIG. 3 is a block diagram showing an exemplary functional arrangement of a user terminal according to the first mode for carrying out the present invention.

FIG. 3 is a block diagram of a user terminal used in the first mode for carrying out the present invention. The user terminal 200 comprises a communication interface 201 and control processing means 202. The communication interface 201 comprises either a wired or wireless LAN interface, a modem or a communication instrument such as a cellphone(module) or the like, and any interface may be used which is capable of a communication with a communication equipment connected with the network 10 through the access point 30.

The control processing means 202 comprises a control unit 202*a* including a CPU which executes a program, a memory which stores the program and the like, an authentication request means 203 and a service request means 230. The functions of these means may be served by modules of the program or by the execution of the program as in the authentication server 100. The authentication request means 203 comprises user authentication information generating means 210, user authentication information transmitting means 220 and ticket reception means 231.

The user authentication information generating means 210 generates a user authentication information including information which represents a user name and a password. The user authentication information generating means 210 responds to an entry of a user name and a password from an entry instrument 40 such as a keyboard, for example, by generating user authentication information in accordance with the entered information. Alternatively in place of the user name and the password, at least one of the following information required by the authentication server 100 in order to authenticate a user, is used for the user authentication information, information generated on the basis of the key pair for authentication the user, information which authenticates biometrics of the user, etc., which are used in known methods of the user authentication.

The user authentication information transmitting means 220 transmits the user authentication information which is generated by the user authentication information generating means 210 to the authentication server 100 through the communication interface 201 for purpose of authentication request.

The ticket reception means 231 receives a packet including the ticket (CK1) 51 transmitted from the authentication server 100 through the communication interface 201, and the address $A_U$ contained in the received ticket 51 is set up and registered as a source address $A_S$ in the communication interface 201, for example, in a register 201*a* by a source address set-up means 231*a*. Alternatively, an address contained in the ticket 51 received by a source address set-up means 230*a* of the service request means 230 may be set up and registered as a source address $A_S$ in the register 201*a* within the communication interface 201.

The service request means 230 includes a session establishing means 232, requesting a service to be provided by the application server 300.

Figure 6:
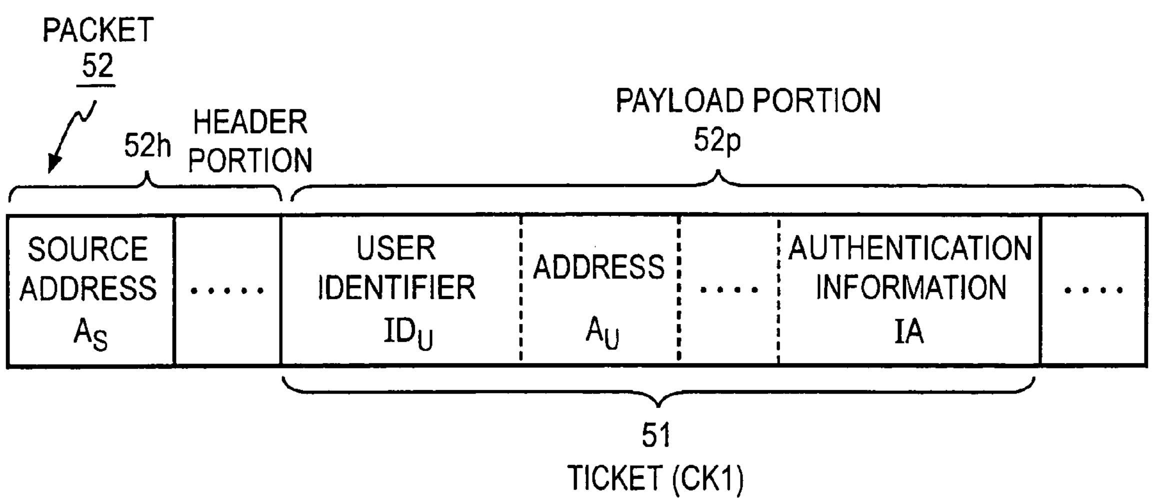
FIG. 6 is a view showing an example of construction of a packet including a ticket which is used in the first mode for carrying out the present invention.

The session establishing means 232 establishes a session between the application server 300 and the user terminal 200 depending on the service utilized by the user. For example, the session establishing means 232 establishes a session by transmitting the ticket (CK1) 51 received by the ticket reception means 231 to the application server 300 through the communication interface 201 at some step during the processing operation to establish the session. A session establish request packet 52 consists of a header portion 52*h* including the source address $A_S$ and a payload portion 52*p* including the ticket 51, as illustrated in FIG. 6, for example.

For example, the session establishing means 232 transmits the packet 52 to the application server 300 through the communication interface 201. The communication interface 201 sets up the address $A_S$ which is registered by the source address set-up means 231*a* of the ticket reception means 231 as a source address of the packet 52 and transmits the packet 52. The service request means 230 transmits packets representing a service request (service request packets) to the application server 300 during the established session using the address registered in the communication interface 201 as the source address $A_S$.

[First Mode] Application Server

Figure 4:
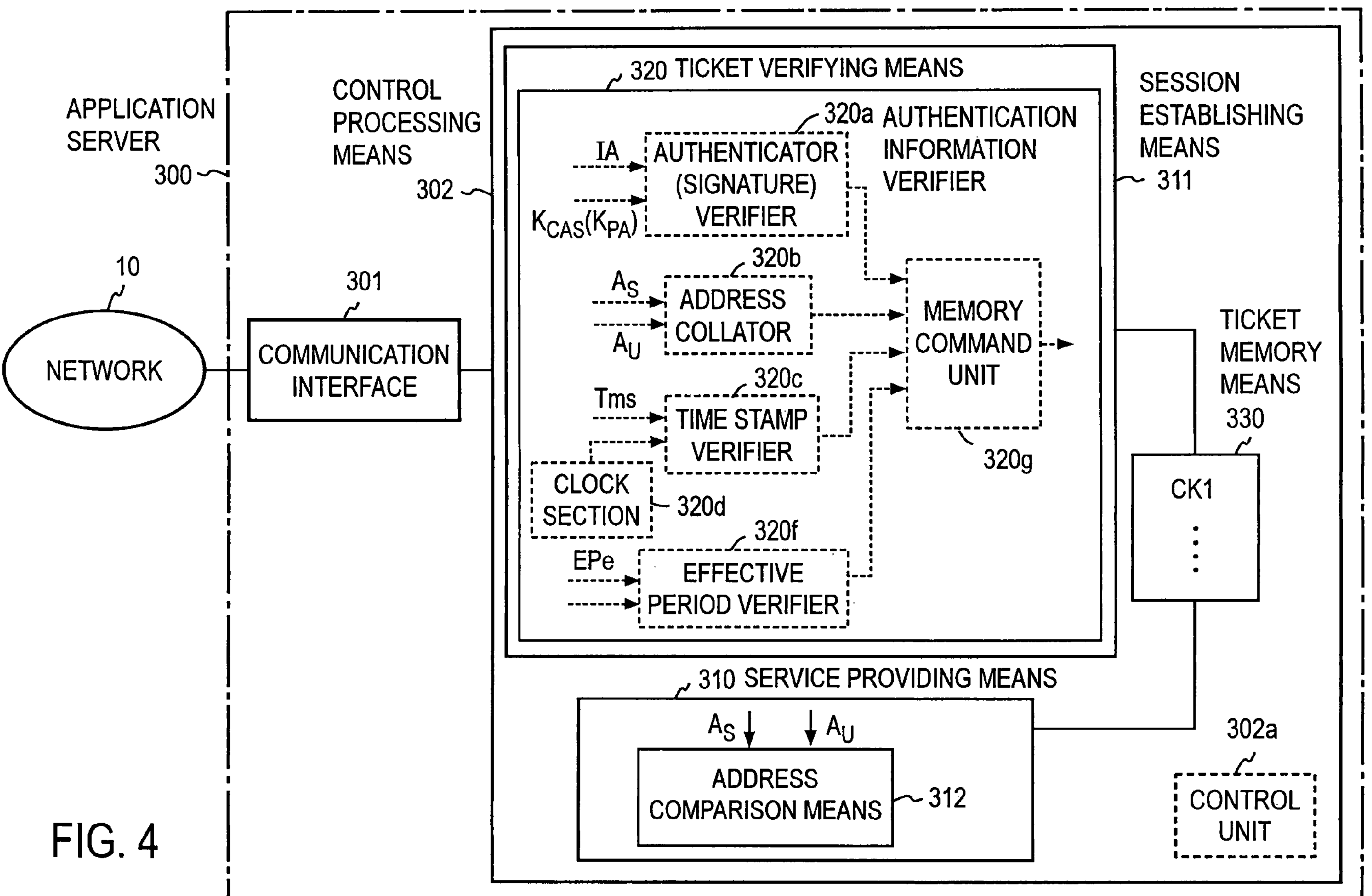
FIG. 4 is a block diagram showing an exemplary functional arrangement of an application server according to the first mode for carrying out the present invention.

FIG. 4 is a block diagram of an application server which is used in the first mode for carrying out the invention. An application server 300 comprises a communication interface 301 and a control processing means 302. The communication interface 301 may comprise a modem or LAN interface, for example, and any interface may be used provided it enables a communication with a communication equipment connected to the network 10.

The control processing means 302 comprises a control unit 302*a* including a CPU which processes a program, a memory which stores the program and the like, a service providing means 310, a session establishing means 311 and a ticket memory means 330. In the similar manner as in the authentication server 100, these means may be served by modules of the program.

The service providing means 310 includes an address comparison means 312, and provides a service which is requested by the user terminal 200.

The session establishing means 311 includes a ticket verifying means 320, and establishes a session with the user terminal 200. In the procedure to establish a session, the session establishing means 311 receives a packet 52 including the ticket (CK1) 51 transmitted from the user terminal 200.

The ticket verifying means 320 verifies whether or not the ticket (CK1) 51 contained in the packet 52 is forged. The ticket verifying means 320 verifies the authentication information IA contained in the received ticket 51 in an authentication information verifier 320*a*, for example. Specifically, if authentication information IA is an authenticator(MAC: message authentication code), it verifies whether or not the ticket 51 has been forged in the authenticator verifier 320*a* using a shared secret key $K_{CAS}$ which is previously shared with the authentication server 100. In addition, the ticket verifying means 320 collates the address $A_U$ contained in the ticket 51 against the source address $A_S$ in the packet 52 in an address collator 320*b*, and if they do not coincide, the verification fails.

In addition, if the ticket (CK1) 51 contains the effective period EPe, the ticket verifying means 320 may verify whether or not the ticket 51 is within its effective period in an effective period verifier 320*f* in accordance with a time information from the clock section 320*d*. The ticket verifying means 320 may perform a verification by choosing shared secret keys which are individually prepared for each period according to a value in the time stamp Tms contained in the ticket (CK1) 51. When the time stamp Tms is contained in the ticket (CK1) 51, the ticket verifying means 320 may verify whether or not the ticket 51 is effective according to a time information from the clock section 320*d* and the date and the time the ticket has been produced as represented by the time stamp. Alternatively, the effective period verifier 320*f* may verify whether or not a service requested by the user based on the time stamp contained in the ticket 51 and the information representing the effective period is within the effective providing period of the service providing means 310.

When a result of the collation of the address $A_U$ contained in the ticket (CK1) 51 and the source address $A_S$ of the packet 52 performed by the ticket verifying means 320 indicates a match and it is determined that the ticket has been transmitted from a user terminal having the authentic address, this ticket 51 is stored in the ticket memory means 330. However, if any one of other verifications and collations performed by the ticket verifying means 320 is unsuccessful, the ticket 51 is prevented from being stored in the ticket memory means 330. For example, outputs from the verifiers 320*a*, 320*c*, and 320*d* and the collator 320*b* are input to a memory command unit 320*g*, and if any one of the inputs indicates unsuccessful, a command to store the ticket 51 is not generated.

The address comparison means 312 verifies whether or not the source address $A_S$ coincides with the corresponding address $A_U$ which is contained in the ticket 51 by referring to the ticket memory means 330 in accordance with the source address $A_S$ of the packet representing the service request. When the address $A_U$ contained in the ticket 51 coincides with the source address $A_S$ of the packet, the service providing means 310 transmits to the user terminal 200 packets which are effective to provide a service requested by the user terminal 200 to the user.

If required, the service providing means 310 may make an inquiry based on the user identifier $ID_U$ contained in the ticket 51 to the authentication server 100 about the user information. In addition, the service providing means 310 may transmit an information relating to the charge involved with the service provided to the user database 20 through the authentication server 100. In this instance, if the ticket CK1 contains the identification information of the authentication server 100, as shown in FIG. 5, the authentication server can be specified if there exist a plurality of authentication servers, and if authentication server identification information is an address (for example, an address $A_A$), this address may be used to access the authentication server 100 immediately.

[First Mode] Processing Procedure of the Authentication System

Figure 7:
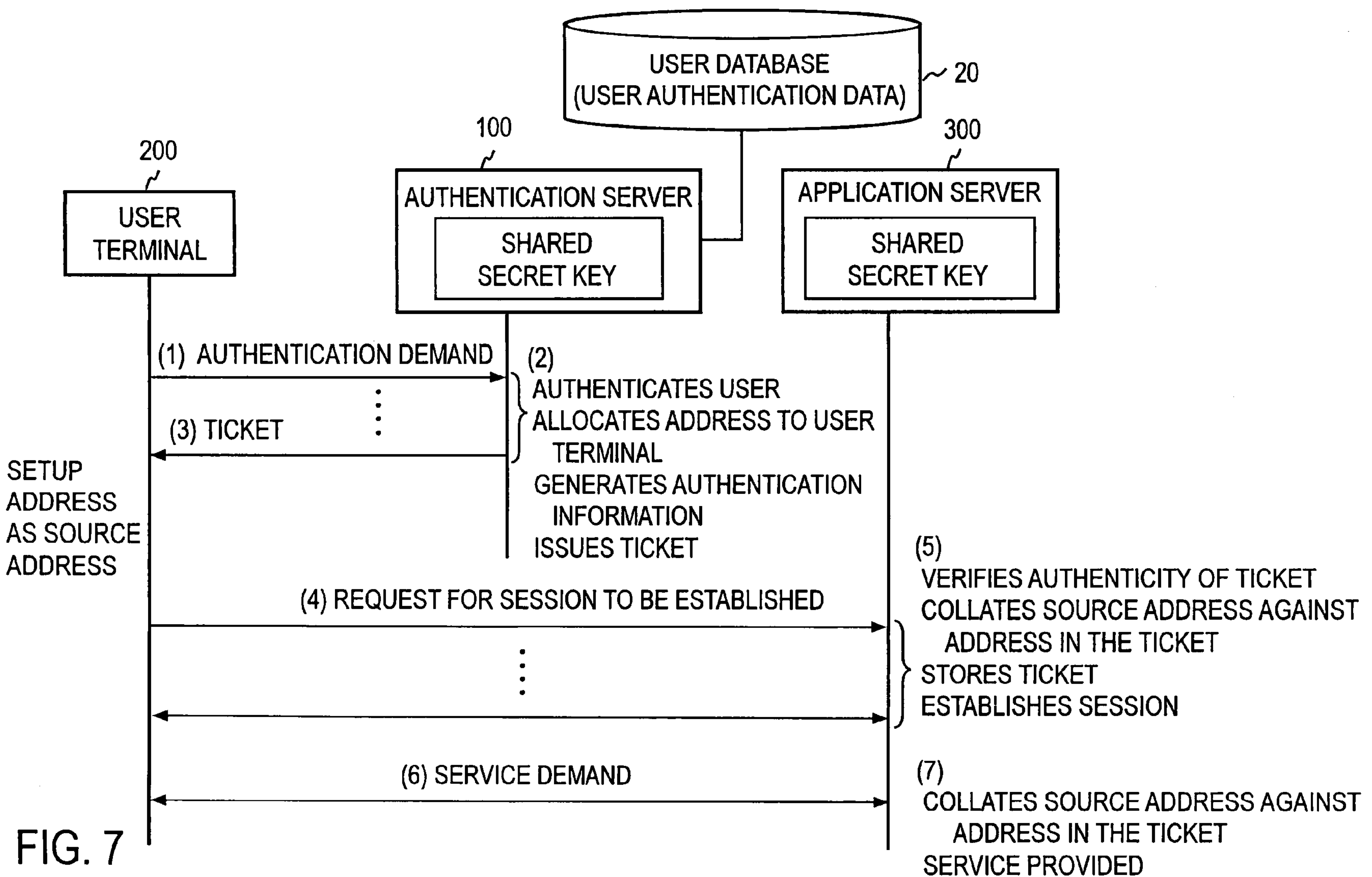
FIG. 7 is a sequence diagram showing an exemplary processing procedure of the authentication system according to the first mode for carrying out the present invention.

A processing procedure of the address based authentication system according to the first mode for carrying out the invention will now be described with reference to FIG. 7.

(1) Initially, when the authentication of the user is requested to the authentication server, the user terminal 200 prepares user authentication information, which is then transmitted through the access point 30 to the authentication server 100.

(2) Upon receiving the authentication request, the authentication server 100 performs an authentication of the user on the basis of the user authentication information. Upon a successful authentication of the user, the authentication server 100 allocates a user identifier $ID_U$ to the user, allocates an address $A_U$ to the user terminal 200 which corresponds to the user, and issues a ticket 51 containing an authentication information IA for the allocated address $A_U$, a time stamp, and an effective period and the like as required, and (3) transmits the ticket 51 to the user terminal 200.

(4) Upon receiving the ticket 51, the user terminal 200 sets up the address of the ticket 51 as a source address $A_S$, and transmits a packet 52 including the ticket 51 to the application server 300, thus requesting a session with the application server 300 to be established.

(5) Upon receiving the packet 52, the application server 300 verifies the correctness of the ticket according to the authentication information, and upon a successful verification, collates the source address $A_S$ of the packet against the address $A_U$ contained in the ticket 51, and if they match, stores the ticket 51 and establishes a session.

(6) When the session is established, the user terminal 200 transmits service request packets to the application server 300 through the established session.

(7) Upon receiving these service request packets, the application server 300 determines whether or not the source address $A_S$ of the service request packet coincides with the address $A_U$ contained in the stored ticket 51, and upon coincidence between the addresses, it transmits a packet which is effective to provide the service to the user to the user terminal 200.

[First Mode] Processing by the Authentication Server

Figure 8:
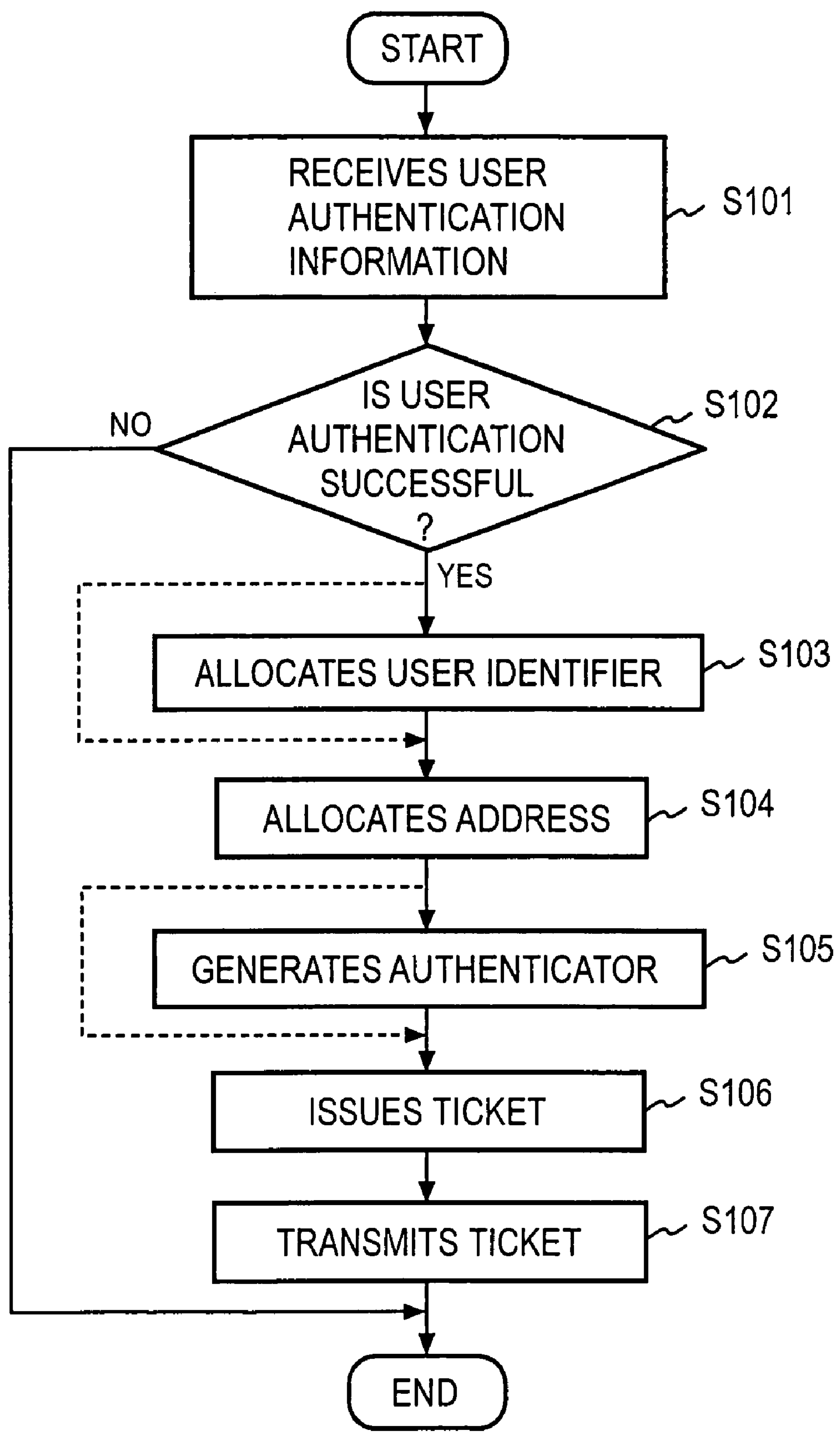
FIG. 8 is a flow chart showing an exemplary flow of processings by the authentication server according to the first mode for carrying out the invention.

FIG. 8 is a flow chart showing a flow of processings by the authentication server 100 which is used in the first mode for carrying out the invention.

Initially, the authentication information which is transmitted from the user terminal 200 is received through the communication interface 101 by the user authentication information reception means 110 (S101) and an authentication of the user is made by the authentication means 120 on the basis of the user authentication information, and upon a successful authentication of the user, the operation proceeds to S103, while upon an unsuccessful authentication of the user, the operation is terminated (S102).

Upon a successful authentication of the user, the address $A_U$ is allocated to the user terminal 200. In this example, a user identifier $ID_U$ corresponding to the user is allocated by the user identifier allocating means 130 (S103), and an address $A_U$ is allocated by the address allocating means to the user terminal which corresponds to the user identifier $ID_U$ (S104).

Then a provisional ticket which includes the user identifier $ID_U$ allocated by the user identifier allocating means 130 and the address $A_U$ allocated by the address allocating means 140 in this example is temporarily produced by the ticket issuing means 150, and using a shared secret key which is beforehand shared with the application server 300, the authentication information generating means 151 generates an authenticator MAC for the provisional ticket (S105).

A ticket 51 containing the user identifier $ID_U$, the address $A_U$ and the authenticator MAC or the like is then issued by the ticket issuing means 150 (S106), and the ticket 51 is transmitted by the ticket transmitting means 160 to the user terminal 200 through the communication interface 101 (S107).

[First Mode] Processing by the User Terminal

Figure 9A:
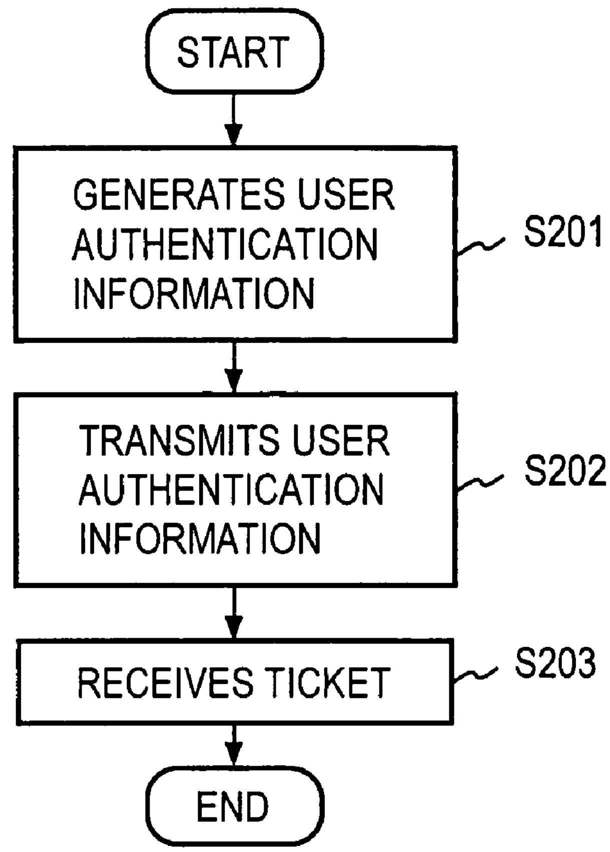
FIG. 9A is a flow chart showing an exemplary flow of processings which occur during a user authentication at a user terminal according to the first mode for carrying out the present invention.
Figure 9B:
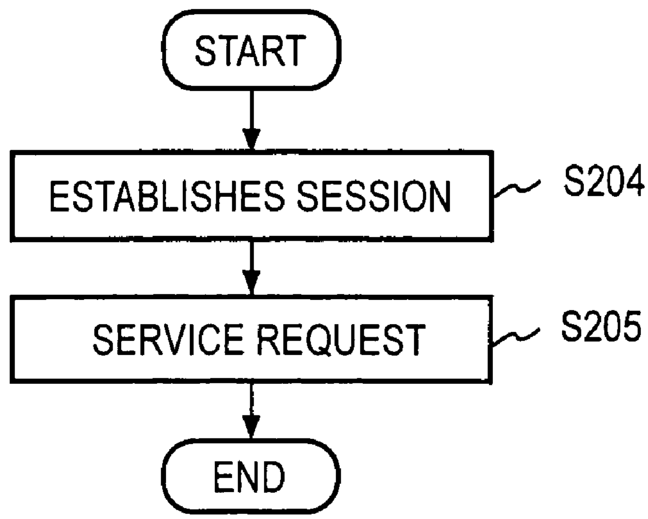
FIG. 9B is a flow chart showing an exemplary flow of processings which occur during a service request.

FIGS. 9A and 9B are flow charts showing a flow of processings by the user terminal 200 which is used in the first mode for carrying out the invention.

Initially, as shown in FIG. 9A, a user authentication information including information representing a user name and a password is generated by the user authentication information generating means 210 (S201), and the user authentication information is transmitted by the user authentication information transmitting means 220 to the authentication server 100 through the communication interface 201 (S202).

The ticket 51 transmitted from the authentication server 100 is received by the ticket reception means 231 (S203).

As shown in FIG. 9B, after the ticket 51 has been received, a session with the application server 300 is established by the session establishing means 232 (S204). After a session with the application server 300 has been established, packets representing a service request are transmitted by the service request means 230 to the application server 300 through the session (S205).

[First Mode] Processing by the Application Server

Figure 10:
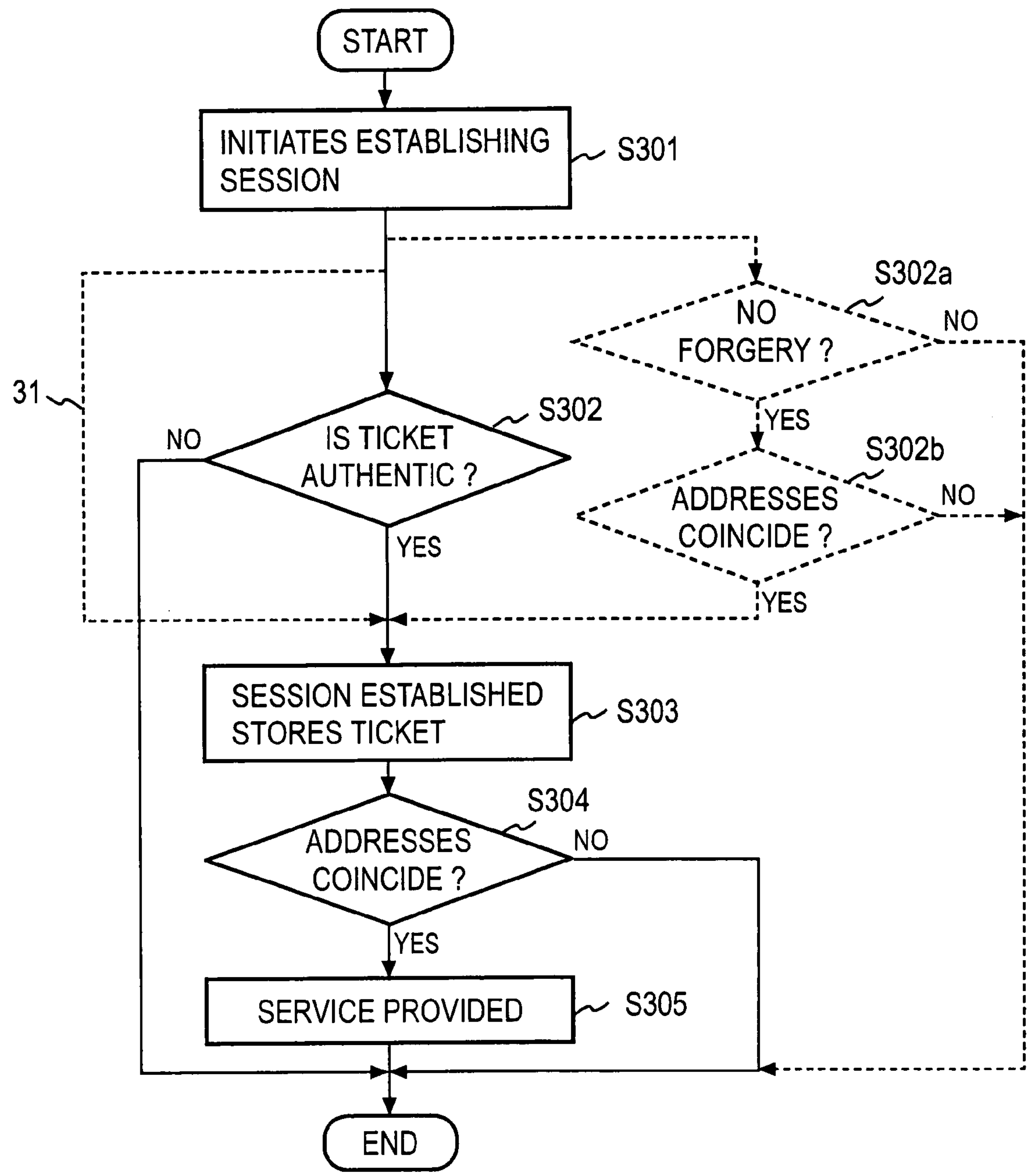
FIG. 10 is a flow chart showing an exemplary flow of processings by the application server according to the first mode for carrying out the present invention.

FIG. 10 is a flow chart showing a flow of processings by the application server 300 which is used in the first mode for carrying out the present invention.

Initially, the establishment of a session of the user terminal 200 is initiated by the session establishing means 311 (S301), and the ticket 51 contained in the packet 52 is received by the application server 300. The ticket 51 is verified by the ticket verifying means 320, and when the ticket 51 is verified to be authentic, the operation proceeds to S303 while if the ticket 51 is verified to be not authentic as by being forged, the operation is terminated (S302).

When the ticket 51 is verified to be authentic, a session is established by the session establishing means 311 and the ticket 51 is stored in the ticket memory means 330 (S303). A packet requesting service which is transmitted from the user terminal 200 is received, and the address comparison means 312 determines whether or not the source address $A_S$ of the packet and the address $A_U$ contained in the stored ticket 51 coincide (S304), and when a coincidence of the addresses is determined, packets which enable the service to be provided to the user by the service providing means 310 through the user terminal 200 is transmitted (S305). If the source address $A_S$ and the address $A_U$ do not coincide, the operation is terminated.

As described above, the address based authentication system according to the first mode for carrying out the present invention issues an address on the basis of the user authentication, and accordingly, it is guaranteed that the address has been issued to an authentic user (user identifier). In view of this relationship, the authentication server 100 issues the ticket 51 containing the allocated address and user identifier, the user terminal transmits the issued ticket 51 to the application server, and the application server 300 verifies and stores the transmitted ticket 51 and collates the source address of the service request packet which is transmitted from the user terminal 200 against the address contained in the stored ticket 51, and upon finding a coincidence therebetween, regards the service request packet as a packet from the authenticated user. In this manner, the address based authentication is enabled.

In other words, the ticket issued by the authentication server on the basis of the user authentication guarantees a correspondence between the user (identifier) and the address, and accordingly, by collating the source address $A_S$ of the service request packet against the address $A_U$ in the stored ticket, it is possible to confirm whether or not this packet has come from the authenticated user.

In this mode, the authenticity of the ticket 51 is verified by using an authentication information which is generated using a shared secret key which is beforehand shared between the application server 300 and the authentication server 100, and accordingly, it is possible to guarantee the authenticity of the ticket 51 issued by the authentication server 100, in particular, the authenticity of the address contained therein.

Also in this mode, the authentication server 100 issues the ticket 51 containing information which represents the effective period of the ticket 51 and the application server 300 verifies the validity of the ticket 51 in terms of the effective period, allowing the effective period to be determined in accordance with the principle of operation of the authentication server 100.

[First Mode] Modification

The user identifier allocating means 130 is not always required in the authentication server 100. The user identifier may be omitted as one of elements of construction of the issued ticket 51. In this instance, the user identifier allocating means 130 is omitted, and as indicated in broken lines in FIG. 8, upon a successful authentication at S102, the operation immediately transfers to step S104. However, when the user identifier is used, the ticket 51 itself provides a correspondence between the address $A_U$ allocated to the user terminal 200 and the user, whereby the application server 300 can make an inquiry about the user information to the authentication server 100 using the user identifier. When the user identifier is omitted, it is necessary that this inquiry be made by using the address $A_U$ and the authentication server 100 is required to store a correspondence between the address $A_U$ allocated to the user terminal and the user ID.

Figure 11A:
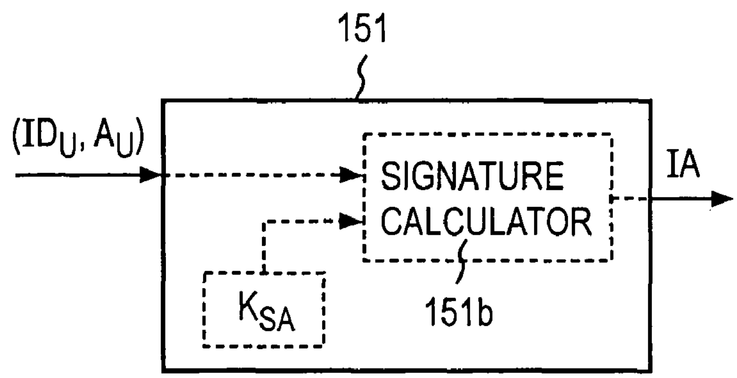
FIGS. 11A and 11B illustrate examples of a different functional arrangement of authentication information generating means 151 shown in FIG. 2.
Figure 11B:
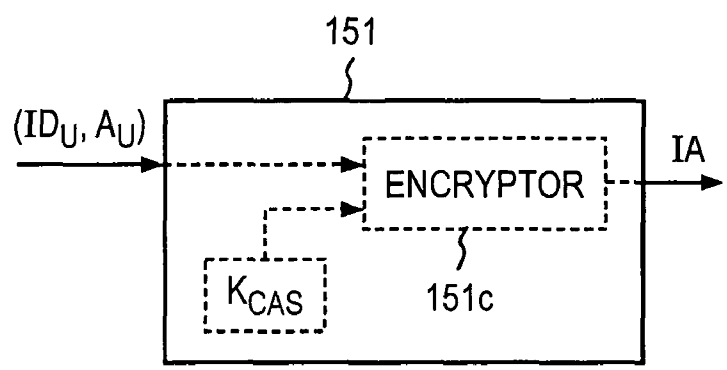
Figure 11C:
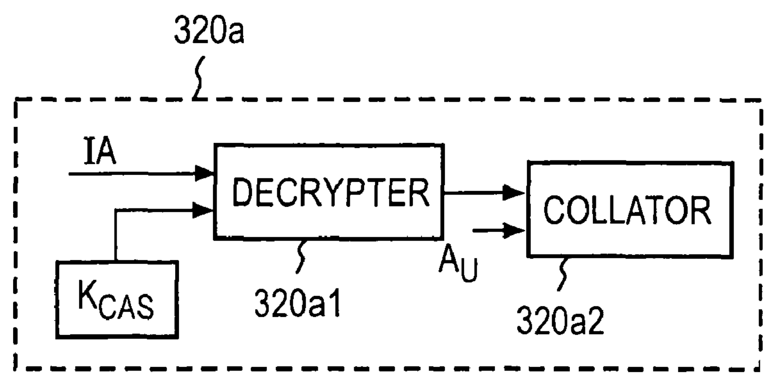
FIG. 11C illustrates an example of a different functional arrangement of an authentication information verifier 320*a* shown in FIG. 4.

The authentication information IA generated by the authentication information generating means 151 is not limited to the authenticator MAC. As illustrated in FIG. 11A, for example, the provisional ticket ($ID_U$, $A_U$) may be input to a signature calculator 151*b* to perform a digital signature calculation with respect to the provisional ticket ($ID_U$, $A_U$) using the private key $K_{SA}$ of the authentication server 100 which is based on the public key cryptography to generate a signature, which may be used as the authentication information IA. Alternatively, as illustrated in FIG. 11B, the provisional ticket ($ID_U$, $A_U$) which is input to the authentication information generating means 151 may be encrypted in an encryptor 151*c* using the secret key $K_{CAS}$ shared with the application server 300, and the encrypted provisional ticket may be used as authentication information IA.

Where a signature is used as the authentication information IA, the authentication information verifier 320*a* within the application server 300 will be a signature verifier rather than the authenticator verifier, as indicated in parentheses in FIG. 4, and the signature as the authentication information IA is subject to a signature verification with the public key $K_{PA}$ of the authentication server 100. If the entire ticket 51 is encrypted to be used as the authentication information IA, the authentication information verifier 320*a* is constructed as shown in FIG. 11C where the authentication information IA is decrypted in a decryptor means 320*a*1 using the shared secret key $K_{CAS}$ with the authentication server 100, and a decrypted result is collated against the provisional ticket ($ID_U$, $A_U$) in the collator 320*a*2, leading to a successful verification for the coincidence therebetween.

Where the user identifier is not used as one element of the ticket 51, the provisional ticket comprises only the address $A_U$. Where the time stamp or the like is contained as an element of ticket 51, it is treated as a part of provisional ticket, and the authentication information IA for the provisional ticket is prepared. In sum, every element other than the authentication information IA in the ticket 51 may be treated as a provisional ticket to prepare the authentication information IA. The authentication information IA in the ticket 51 may be omitted. Thus, as indicated in broken lines in FIG. 8, the operation may directly transfer from step S104 to Si 06. However, when the authentication information IA is used, the verification of the ticket which takes place at step S302, indicated in broken lines in FIG. 10 and which takes place in the application server 300, initially verifies the authentication information IA to verify whether or not the provisional ticket is forged (S302*a*), and when it is confirmed that the ticket is not forged, and accordingly the address $A_U$ contained in the ticket 51 is not forged, but is authentic, the source address $A_S$ is collated against the address $A_U$ in the ticket to see if the both addresses coincide (S302*b*), and upon coincidence, the operation transfers to S303, while the operation is terminated for a non-coincidence.

As elements in the ticket 51, either one or both of the time stamp and the effective period may be omitted. In the application server 300, each time a session with the user terminal 200 is established, the ticket CK1 of the packet which is received from the user terminal 200 may be immediately stored in the ticket memory means 330. Thus, the ticket verifying means 320 shown in FIG. 4 may be omitted, and the operation may proceed from the processing S301 directly to the processing S303 as indicated in broken lines 31 in FIG. 10. Even if a change is made in this manner, the transmission of the ticket CK1 takes place only once from the user terminal to the application server 300 each time a session is established, and because the user authentication takes place by the authentication server each time the user terminal requires a new service and the address (the address contained in the ticket CK1) which is then allocated to the user terminal 200 changes, thus it is difficult that a third party impersonates the user by eavesdropping the source address $A_S$.

The user database 20 is not always required to be connected to the authentication server 100. For example, when the user authentication takes place using the public key cryptography, there is no need for authentication data. However, in order to confirm that a user public key certificate which is transmitted from the user terminal 200 is reliable, an inquiry is made to the public key certificate issuing organization which has issued the public key certificate, and if it is authentic, the user information contained in the public key certificate is acquired, and if it is insufficient, a database within the public key certificate issuing organization acquires information concerning a corresponding user.

The authentication server 100 may be constructed with a group of servers which are connected together through a secure network and which have a dependable relationship relative to each other. For example, it may comprise a devoted authentication server, an address issuing server, a ticket issuing server and the like which are connected together through a secure network.

[Second Mode] Arrangement of Authentification System

A second mode for carrying out the present invention will now be described, with the description principally dealing with a distinction from the first mode. In the second mode also, an authentication server, user terminals and application servers are provided and although they have different functions from the first mode, the system arrangement is similar to the first mode shown in FIG. 1, and accordingly, reference numerals used in the second mode are indicated in parentheses in FIG. 1. An authentication server 400, user terminals 500 and application servers 600 are connected in a manner to permit a communication therebetween through the network 10.

In the second mode, a user terminal 500 transmits a key information in addition to user authentication information when it requests an authentication by an authentication server 400. Thus, the user terminal 500 has key information. Key information includes information relating to an public key of a user or a user terminal such as a public key of a user key pair, a public key of a terminal key pair, a certificate including such public key, or hashed value which is obtained by applying one-way hash function to the public key or the certificate including the public key.

When issuing a ticket upon a successful user authentication in response to an authentication request from a user terminal 500, in the second mode, the authentication server 400 causes key information transmitted from the user terminal to be contained in the ticket in addition to the user identifier and the address.

[Second Mode] Authentication Server

Figure 12:
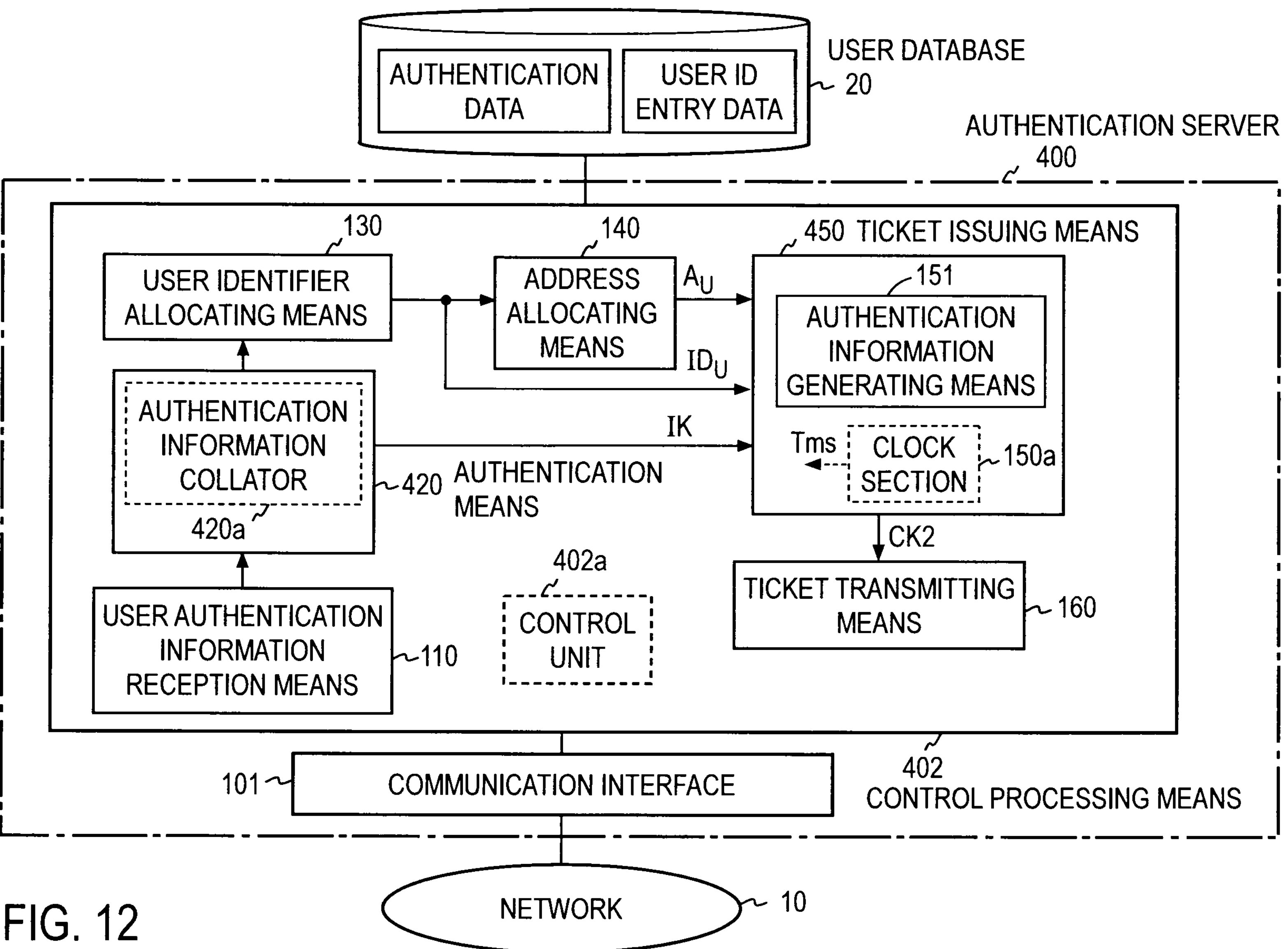
FIG. 12 is a block diagram showing an exemplary functional arrangement of an authentication server according to the second mode for carrying out the present invention.

FIG. 12 is a block diagram of an authentication server which is used in the second mode for carrying out the present invention. The authentication server 400 comprises a communication interface 101 and a control processing means 402.

The control processing means 402 comprises a control unit 402*a* including a CPU (Central Processing Unit) which processes a program and a memory which stores the program and the like, a user authentication information reception means 110, an authentication means 420, a user identifier allocating means 130, an address allocating means 140, a ticket issuing means 450 and a ticket transmitting means 160. It should be understood that these means may be constructed by modules of the programs.

The authentication means 420 performs an authentication of the user on the basis of user authentication information which is received by the user authentication information reception means 110. By way of example, the authentication means 420 verifies a matching between the user authentication information and authentication data stored in the user database 20 in an authentication information collator 420*a* for purpose of user authentication. If required, the authentication server may also confirm whether or not a user terminal keeps a private key related to a key information IK. For example, the possession of a private key which forms a pair with an public key corresponding to a key information IK may be confirmed.

Figure 15:
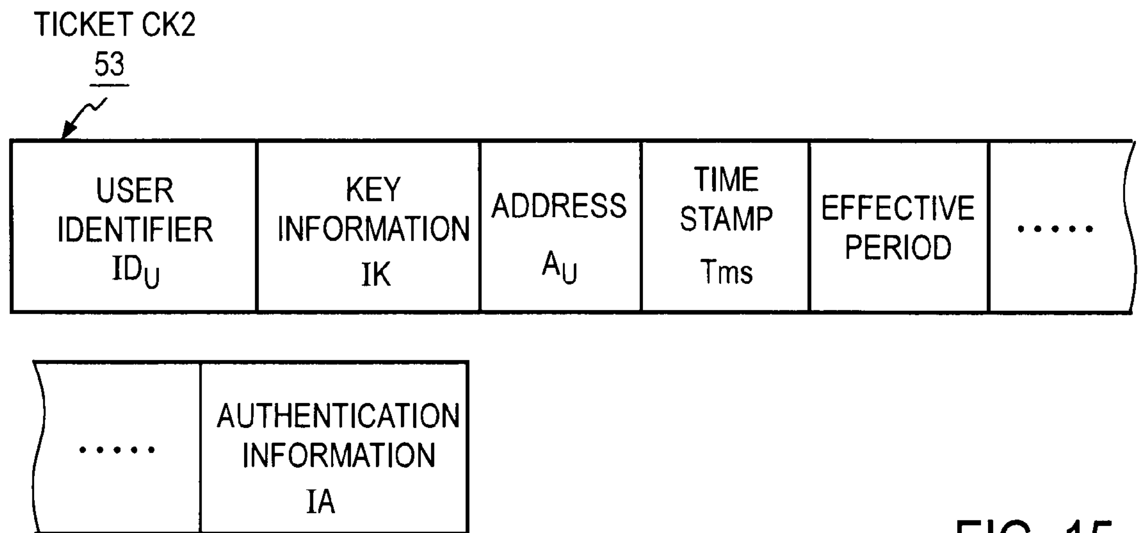
FIG. 15 is a view showing an example of construction of a ticket which is used in the second mode for carrying out the present invention.

The ticket issuing means 450 includes an authentication information generating means 151, and issues a ticket containing an address $A_U$ allocated by the address allocating means 140, a user identifier $ID_U$ allocated by the user identifier allocating means 130, key information transmitted from the user terminal 500 together with the user authentication information, and authentication information IA generated by the authentication information generating means 151. In this manner, the ticket provides a correspondence between the user identifier and a key information. Thus, the authenticated user corresponds to a user terminal which keeps the private key associated with the key information. The ticket may contain a time stamp when the ticket has been issued, an effective period of the ticket, a communication band width allocated to the user terminal 500 and information relating to an access point 30 which covers the user terminal 500. An example of the ticket 53 is shown in FIG. 15. The ticket 53 is distinct from the ticket 51 used in the first mode in that the ticket 53 contains key information.

Upon a successful user authentication in response to an authentication request, the authentication server 400 allocates a user identifier to the user, and also allocates an address to an user terminal which corresponds to the user identifier. This address is set up as a source address in the user terminal 500 in the similar manner as in the first mode. Since the key information is associated with the public key of the user terminal 500, it follows that the authentication server 400 has made a user authentication by linking the user and the user terminal 500 utilized by the user (as a pair) by the key information, and the user terminal having the key information is allocated with the address.

According to the second mode, a user key pair for the user authentication is distinct from a terminal key pair for establishing a session, and the user key pair is held by an authentication device which is connected to the user terminal, whereby a user terminal located anywhere can be utilized by connecting the authentication device thereto. As a method of user authentication, a method which does not utilize the key pair may also be used.

[Second Mode] User Terminal

Figure 13:
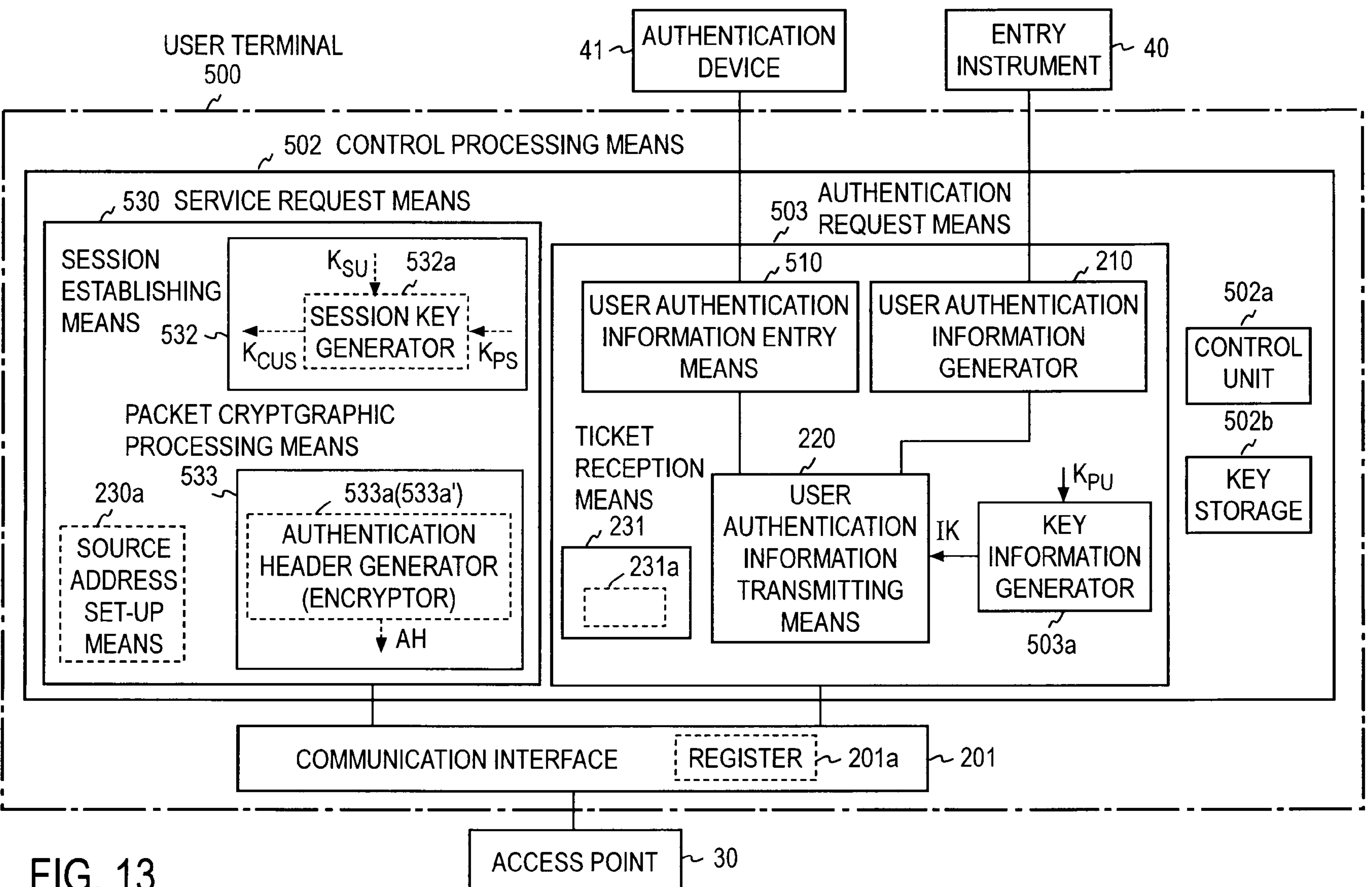
FIG. 13 is a block diagram showing an exemplary functional arrangement of a user terminal according to the second mode for carrying out the present invention.

FIG. 13 is a block diagram of a user terminal which is used in the second mode for carrying out the present invention. The user terminal 500 comprises a communication interface 201 and control processing means 502. The control processing means 502 comprises a control unit 502*a* including a CPU for processing a program, a memory for storing the program and the like, an authentication request means 503, and a service request means 530. It should be understood that these means may be constructed by the modules of the program. The authentication request means 503 includes a user authentication information entry means 510, a user authentication information transmitting means 220 and a ticket reception means 231.

The user authentication information entry means 510 causes an authentication devices 41 to enter user authentication information and the like. The private key of the user key pair which is stored in the authentication device 41 cannot be taken out of the authentication device 41. The authentication device 41 may comprise a smart card, a hardware authentication token including USB (Universal Serial Bus) key, or a biometrics authentication device. Alternatively, a password/user name may be entered through an entry instrument 40 to be fed to a user authentication information generator 210 to generate user authentication information. Where the authentication device 41 is not connected to the user terminal 500 in a simplified arrangement, a terminal key pair stored in a key storage 502*b* may be used in place of the user key pair to generate user authentication information.

A key information generator 503*a* causes the public key $K_{PU}$ of the user terminal 500 to be entered from a key storage 502*b* to generate key information IK. The key information generator 503*a* may deliver the entered public key directly as key information. A user authentication information transmitting means 220 transmits not only the user authentication information but also the key information to the authentication server 400 for purpose of an authentication request.

The service request means 530 comprises a session establishing means 532 and a packet cryptographic processing means 533, and is used to request a service provided by the application server 600. The session establishing means 532 generates in a session key generator 532*a* a secret key which is shared with the application server 600 as a session secret key $K_{CUS}$ from a private key $K_{SU}$ which forms a pair with an public key $K_{PU}$ associated with the key information contained in the ticket 53 and the public key $K_{PS}$ of the application server 600 in conformity to IKE (Internet Key Exchange).

After the session secret key has been shared by the application server 600, or after the secret key shared with the user terminal 500 is also generated as a session secret key in the application server 600, the packet cryptographic processing means 533 calculates an authentication header to transmitted packet information in an authentication header generator 533*a*, using the session secret key which is shared with the application server 600 by the session establishing means 532 in conformity to IPsec (Security architecture for the Internet Protocol) or TLS (Transport Layer Security) and adds the authentication header AH to the packet being transmitted. The authentication header generator 533*a* generates the authentication header by calculating one-way hash function with respect to the packet using the session secret key, thus allowing a recognition of whether or not the packet has been forged. The packet cryptographic processing means 533 may encrypt the packet in conformity to IPsec or TLS in an encryptor 533*a*' as indicated in parentheses in FIG. 13. Alternatively, the packet 54 can be added with the authentication header AH, and the resulting packet may be encrypted in the encryptor 533a'. The addition of the authentication header AH plus the cryptographic processing of the packet is generically referred to as a packet cryptographic processing, and an arrangement which performs such processing is referred to as a packet cryptographic processing means.

Figure 16:
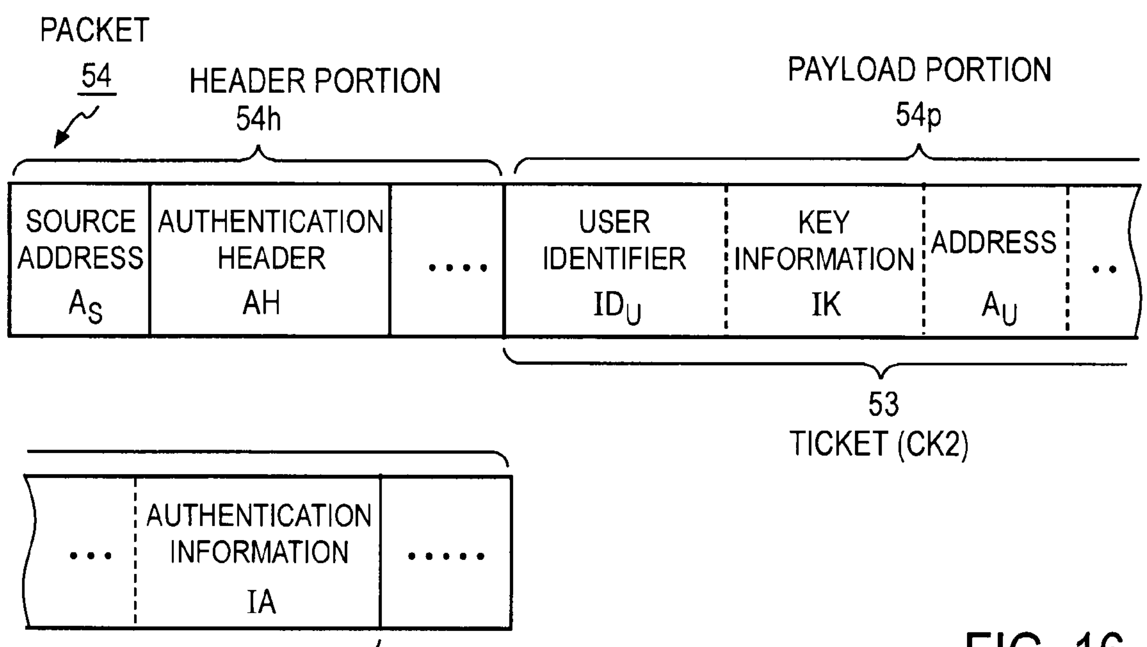
FIG. 16 is a view showing an example of construction of a packet added with an authentication header which is used in the second mode for carrying out the present invention.

An example of construction of a packet 54 generated by the packet cryptographic processing means 533 is shown in FIG. 16. As a distinction from the packet 52 shown in FIG. 6, the header 54h is added with an authentication header and a ticket 53 in a payload 54p is added with a key information. It is to be noted that a packet may be encrypted in the encryptor 533a and added with the authentication header AH.

[Second Mode] Application Server

Figure 14:
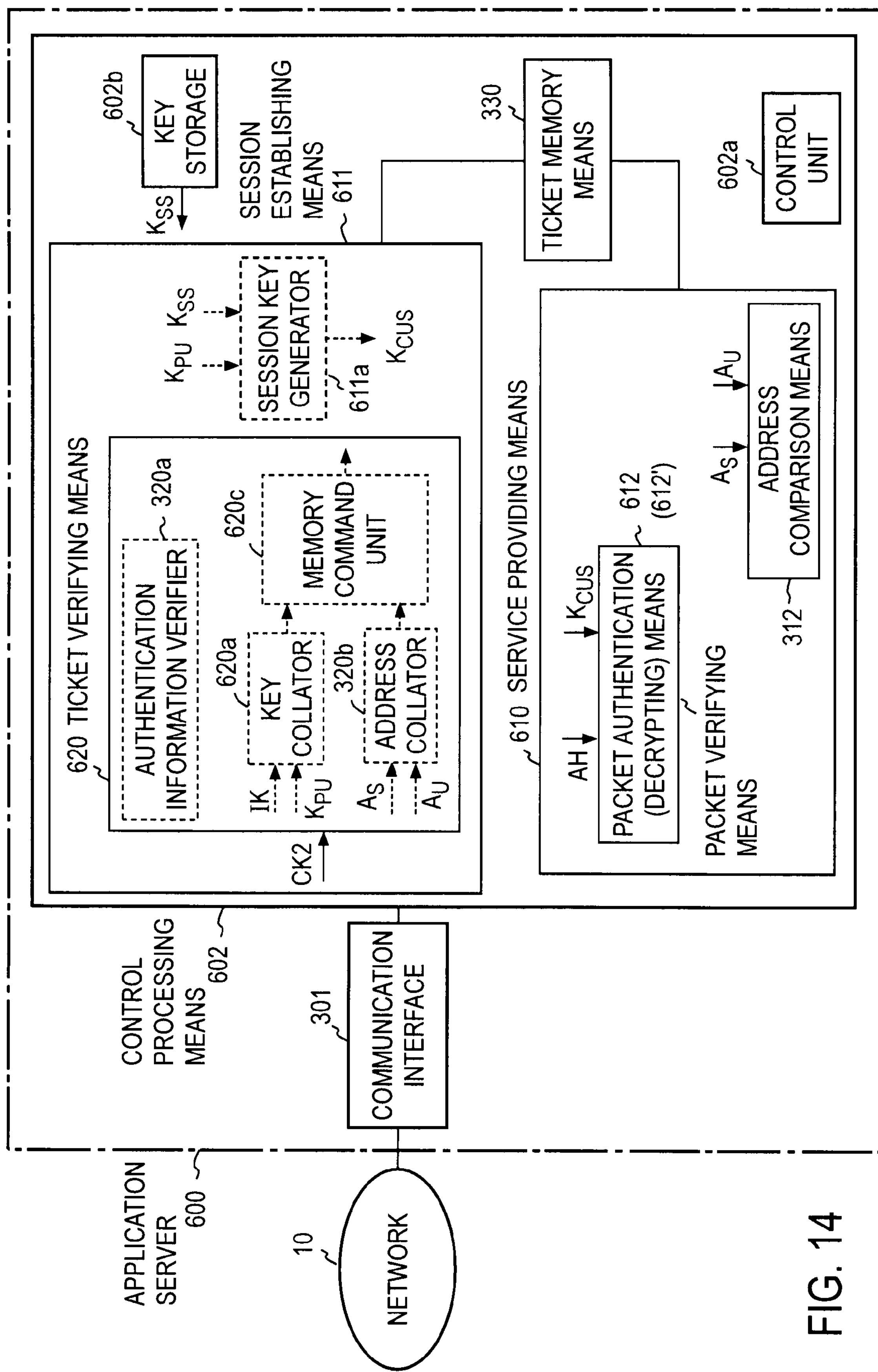
FIG. 14 is a block diagram showing an exemplary functional arrangement of an application server according to the second mode for carrying out the present invention.

FIG. 14 is a block diagram of an application server used in the second mode for carrying out the present invention. An application server 600 comprises a communication interface 301 and control processing means 602. The control processing means 602 comprises a control unit 602a including a CPU which processes a program, a memory which stores the program and the like, a service providing means 610, a session establishing means 611 and a ticket memory means 330. It is to be noted that these means may be constructed by modules of the program.

The service providing means 610 comprises an address comparison means 312 and a packet authentication means 612, and provides a service which is requested by the user terminal 500.

The session establishing means 611 includes a ticket verifying means 620, and establishes a session with the user terminal 500. In a procedure which establishes the session, it shares a session secret key with the user terminal 500 in conformity to IKE or the like. Thus, the session establishing means 611 generates in a session key generator 611a a secret key which is shared with the user terminal 500 as a session secret key $K_{CUS}$ by using a private key $K_{SS}$ of the application server 600 stored in the key storage 602b and the public key $K_{PU}$ of the user terminal 500.

After sharing the session secret key with the user terminal 500, the packet authentication means 612 verifies the authentication header AH which is added to the received packet 54 using the session secret key $K_{CUS}$. If a result of verification of the authentication header which is added to the packet 54 is correct, the packet authentication means 612 delivers the ticket (CK2) 53 in the packet 54 to the ticket verifying means 620. When the received packet 54 is encrypted by the user terminal 500, a packet decrypting means 612' indicated in parentheses is used instead of the packet authentication means 612, and the packet 54 is decrypted with the session secret key $K_{CUS}$. When properly decrypted or when the packet 54 has not been forged, the decrypted packet 54 is delivered to the ticket verifying means 620. The authentication of the authentication header AH or the decrypting processing of the packet 54 is generically referred to as a packet verification, and an arrangement to perform such verification is referred to as a packet verifying means.

The ticket verifying means 620 verifies the authenticity of the ticket 53 which is delivered by the packet authentication means 612. By way of example, the ticket verifying means 620 collates key information IK contained in the ticket 53 against the public key on the user side which is used when sharing the session secret key $K_{CUS}$ in a key collator 620a, and if a matching therebetween applies, and in this example, if the address $A_U$ contained in the ticket 53 is found to coincide with the source address $A_S$ of the packet 54 when collated in an address collator 320b, this fact is detected by a memory command unit 620c, allowing the ticket (CK2) 53 to be stored in the ticket memory means 330. After the session with the user terminal 500 has been established and the ticket (CK2) 53 has been stored in the ticket memory means 330, when a service request packet is received from the user terminal 500 through the session, the service providing means 610 transmits a packet which allows the service requested by the user terminal 500 to be provided through the session of the user terminal 500 when the address comparison means 312 determines that the source address of the packet 54 which has been confirmed (or decrypted) by the packet authentication means 612 (or packet decrypting means 612') as not having been forged in conformity to IPsec or TLS and the like coincides with the address contained in the corresponding ticket (CK2) 53 which is stored in the ticket memory means 330. If required, the ticket verifying means 620 may include various verifiers such as the authentication information verifier 320a which can be provided in the ticket verifying means 320 shown in FIG. 4, in the similar manner as in the application server 300 used in the first mode.

[Second Mode] Processing Procedure of Authentication System

Figure 17:
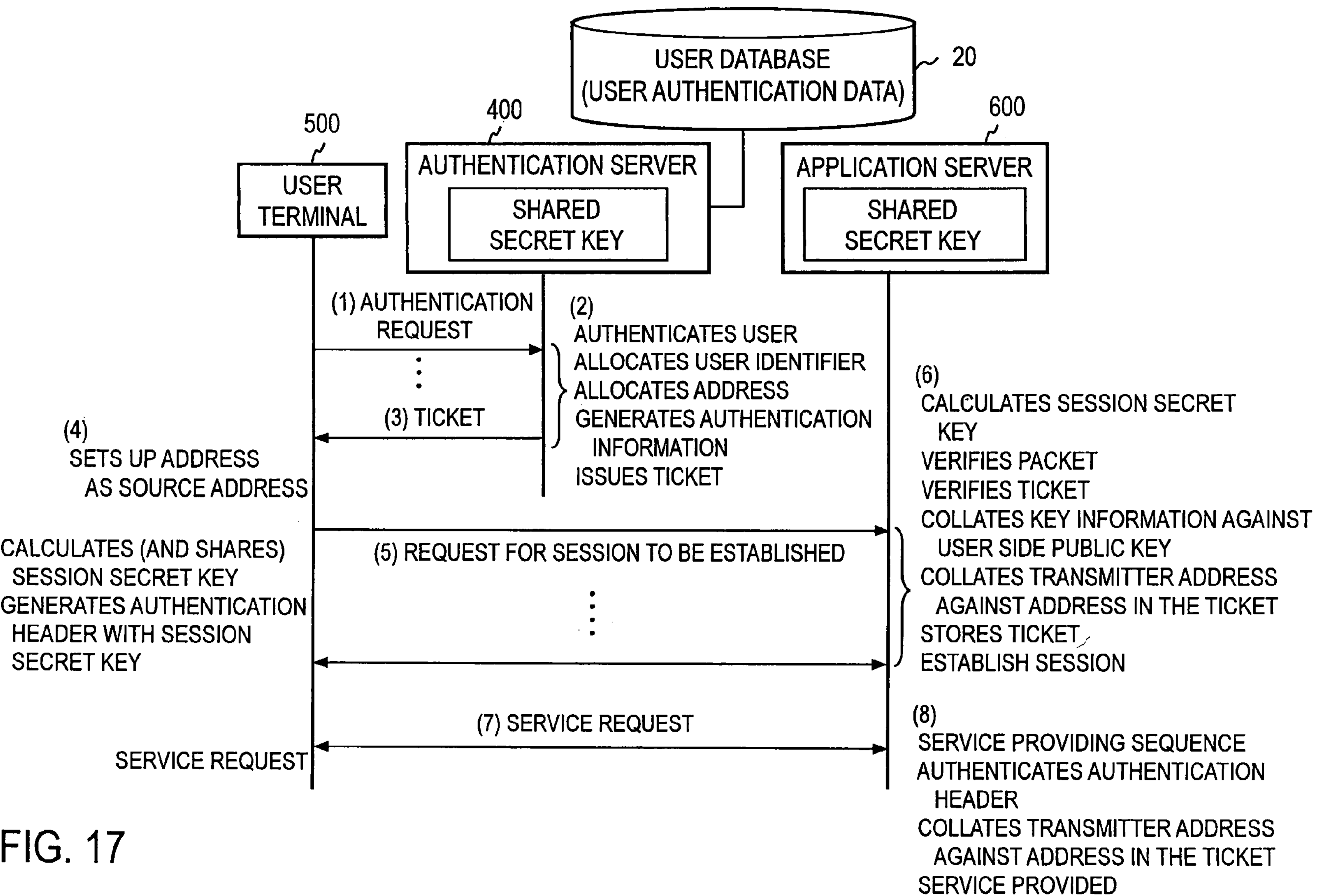
FIG. 17 is a sequence diagram showing an exemplary processing procedure of the authentication system according to the second mode for carrying out the present invention.

A processing procedure of the address based processing system according to the second mode for carrying out the present invention will be described below with reference to FIG. 17.

(1) Initially, the user terminal 500 generates user authentication information and key information IK, and transmits an authentication request to the authentication server 400 through the access point 30.

(2) Upon receiving the authentication request, the authentication server 400 performs an authentication of the user on the basis of the user authentication information, and upon a successful authentication of the user, allocates the user identifier $ID_U$ and allocates the address $A_U$ to the user terminal which corresponds to $ID_U$, and generates authentication information if required, issues a ticket 53 containing the user identifier $ID_U$, the address $A_U$, and the key information IK, (3) and transmits the ticket to the user terminal 500.

(4) The user terminal 500 sets up the address $A_U$ of the received ticket as a source address, (5) the user terminal 500 calculates a session secret key $K_{CUS}$ which is shared with the application server 600 by using its own private key $K_{SU}$ and the public key $K_{PS}$ of the application server 600 in conformity to a key exchange procedures such as IKE. It then generates an authentication header AH for the packet which is to be transmitted to the application server 600 using the session secret key $K_{CUS}$, allowing the header to be added to the packet. In the process of establishing a session, it transmits a packet including the authentication header and the ticket to the application server 600. By a procedure mentioned above, it requests the application server 600 to establish a session.

(6) In the process of establishing a session, the application server 600 calculates the session secret key $K_{CUS}$ using its own private key $K_{SS}$ and the public key $K_{PU}$ of the user terminal, and uses the session secret key $K_{CUS}$ to verify the authentication header AH which is added to the packet, and if required, also verifies the authentication information IA contained in the ticket (CK2) 53 which is received in the process of establishing a session using the shared secret key $K_{CAS}$ with the authentication server 400. It also verifies whether or not the key information contained in the received ticket 53 corresponds to the public key on the user side (user public key or terminal public key) $K_{PU}$ which is used in the calculation of the session secret key $K_{CUS}$, and collates the source address $A_S$ of the received packet 54 against the address $A_U$ contained in the ticket (CK2) 53, and if both of these verifications are successful, it stores the ticket (CK2) 53, thus establishing a session.

(7) In order to protect the source address $A_S$, the user terminal 500 performs at least one of the cryptographic processing which uses the session secret key $K_{CUS}$ and the authentication header addition, and then it transmits a packet representing a service request to the application server 600 through the established session.

(8) The application server 600 decrypts the service request packet with the session secret key $K_{CUS}$ or verifies the authentication header, determines whether or not the address contained in the stored ticket 53 coincides with the source address $A_S$ of the packet which represents the service request, and upon coincidence of addresses, transmits packets which are effective to provide the service to the user to the user terminal 500.

[Second Mode] Processing by the Authentication Server

FIG. 18 is a flow chart showing a flow of processings by the authentication server which is used in the second mode for carrying out the present invention.

Upon receiving the authentication request from the user terminal 500 (S101), an authentication of the user is performed by the authentication means 120 on the basis of the user authentication information, and upon a successful authentication of the user, the operation proceeds to S103 while if the authentication of the user fails, the operation is terminated (S102). The ticket 53 containing the address $A_U$, the user identifier $ID_U$ and a key information IK is issued by the ticket issuing means 450 (S402). Other processings remain similar as in the processing procedure of the authentication server according to the first mode.

[Second Mode] Processings by the User Terminal

FIG. 19 is a flow chart showing a flow of processings by the user terminal used in the second mode for carrying out the present invention.

In the processing of the user authentication request shown in FIG. 19A, user authentication information and key information IK are entered by the user authentication information entry means 510 (S501), and are transmitted by the user authentication information transmitting means 220 to the authentication server 400 through the communication interface 201 (S202). The ticket (CK2) 53 which is transmitted from the authentication server 400 is received by the ticket reception means 231 (S203).

In a subsequent processing shown in FIG. 19B where a session with the application server 600 is established, this processing is initiated by the session establishing means 532, sharing the session secret key between the user terminal 500 and the application server 600. The authentication header addition processing and/or cryptographic processing is applied to the packet 54 including the ticket 53 by the packet processing means 533, and the packet is transmitted to the application server 600 (S502).

After the session with the application server 600 has been established, the packet representing the service request is transmitted by the service request means 530 to the application server 600 through the establishing session, thus requesting the service to the application server 600 (S205).

[Second Mode] Processings by the Application Server

Figure 20:
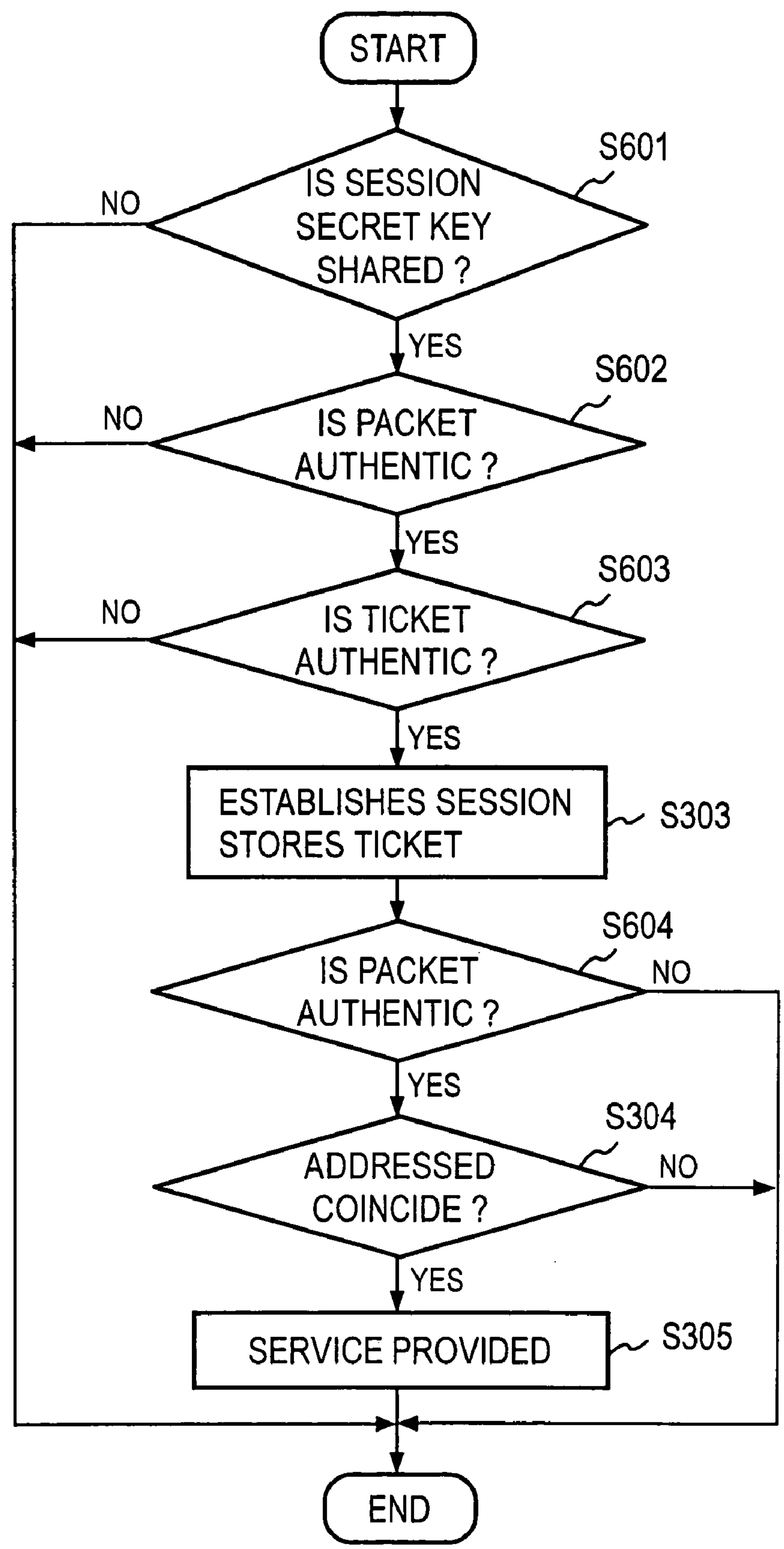
FIG. 20 is a flow chart showing a exemplary flow of processings by the application server according to the second mode for carrying out the present invention.

FIG. 20 is a flow chart showing a flow of processings by the application server used in the second mode for carrying out the invention.

Initially, the establishment of the session with the user terminal 500 is initiated by the session establishing means 611, and the session secret key which is obtained by a calculation from the own private key and the other party's public key in conformity to a key exchange procedure such as IKE is shared between the user terminal 500 and the application server 600 (S601). The packet 54 including the ticket 53 which is transmitted from the user terminal 500 is now received by the application server 600.

The authentication header which is added to the received packet 54 is verified by the packet authentication means 612 using the session secret key, and if the verification reveals that the packet 54 is not forged, but is authentic, the operation proceeds to S603. However, when the verification reveals that the packet 54 is not authentic as by being forged, the operation is terminated (S602). If the packet 54 is encrypted, it is decrypted by the packet decrypting means 612' using the session secret key, and when it is properly decrypted, the operation proceeds to S603.

When the authenticity of the ticket 53 is verified or when at least a matching between the key information contained in the ticket 53 and the public key on the user side which is used in sharing the session secret key is verified, and the source address $A_S$ of the packet 54 coincides with the address $A_U$ contained in the ticket (S603), the ticket 53 is determined to be authentic and is stored in the ticket memory means 330 (S303).

After the session has been established, the packet verifying means verifies whether or not the packet transmitted from the user terminal 500 and requesting a service is not forged and is authentic (S604), and if it is authentic, whether or not the source address of the packet coincides with the address contained in the stored ticket 53 is determined. Upon a coincidence between the addresses (S304), the service providing means 610 provides a service to the user through the user terminal 500 (S305).

A timing when the user terminal 500 transmits the packet 54 including the ticket 53 to the application server 600 may precedes the completion of the key exchange procedure such as IKE. In this instance, prior to the key exchange procedure, it is possible to determine beforehand whether or not the key exchange procedure is to be executed by verifying the ticket 53 transmitted from the user terminal 500 by the ticket verifying means 620. In this manner, an advantage is gained that a processing against an improper service request from a user terminal which does not have a ticket can be excluded at an early stage. However, because the transmission of the packet 54 including the ticket 53 takes place before the session secret key is shared between the user terminal 500 and the application server 600 and thus the packet verifying means cannot function, it follows that the detection of any forgery of the packet 54 cannot be made and there remains the possibility of a tort such as a replacement of the ticket. However, since the authentication information contained in the ticket 53 allows the ticket verifying means 620 to detect any forgery of the ticket 53 itself, when this is combined with verifying a matching between the public key on the user side which is used during the key exchange and the key information contained in the ticket 53, a confirmation that the ticket is transmitted from an authentic user terminal can be made. In other words, if the user terminal 500 transmits the ticket 53 to the application server 600 before the completion (immediately before or during) the key exchange procedure, the security can be finally maintained.

As described above, in the address based authentication system according to the second mode for carrying out the present invention, the authentication server transmits, on the basis of a result of the user authentication which takes place through the user terminal, a ticket which guarantees a correspondence between the user identifier, the address and the key information to the user terminal, the user terminal transmits the ticket to the application server and establishes a session therewith by sharing the session secret key and requests a service to the application server through the session, and the application server stores the ticket after confirming the authenticity of the received ticket, verifies the service request by collating the source address of the received service request packet and the address contained in the stored ticket and provides a service when it is properly verified.

In particular, because when the user terminal 500 transmits a packet to the application server 600, information such as the authentication header which is calculated using the session secret key or the like and which is used to detect any forgery is added to the packet as it is transmitted and the application server 600 confirms that there is no forgery of the packet which is transmitted from the user terminal 500, it is possible to guarantee that there is no forgery of the packet 54 which is transmitted from the user terminal 500 to the application server 600 during the session. In other words, it is guaranteed that there is no forgery in the source address contained in the packet.

In the example mentioned above, in order for the application server to verify a matching between the information received from the user terminal, for example, the public key on the user side, and the key information contained in the ticket when the session is established, the established session can be related to the ticket. In addition, the ticket is issued by the authentication server on the basis of the user authentication which takes place through the user terminal to guarantee an association between the user identifier, the address and the key information, a correspondence between the user terminal having the key related to the key information and the user specified by the user identifier is guaranteed. Consequently, the established session and the ticket guarantee a correspondence between the source address and the user.

Furthermore, since the ticket is issued on the basis of the user authentication as mentioned above, the authenticity of the address contained in the ticket can be guaranteed. Also, the collation of the address contained in the ticket which is stored in the application server against the source address of the packet and a guarantee that there is no forgery of the source address of the packet in the established session guarantee the authenticity of the source address of the packet. As a consequence, the authenticity of the source address of the packet and the correspondence between the source address and the user are guaranteed, thus enabling the address based authentication.

It is to be noted that the guarantee of the authenticity of the address by the ticket, or the guarantee that this is an address issued to a properly authenticated user through a proper procedure is enabled because the function of authenticating the user, the function of issuing the address and the ticket generating function which guarantees an association therebetween are implemented by the same authentication server. The guarantee of the correspondence between the user and the terminal by the ticket is possible because at the same time as the user authentication which takes place through the user terminal, the correspondence between the user and the terminal is determined by the procedure and the arrangement by which the key information is transmitted from the user terminal to the authentication server.

The correspondence between the user, the terminal and the address can be invalidated by erasing the private key relating to the key information from the terminal. This is because the key exchange is impossible without the private key, and if a different key is used, a matching with the key information contained in the ticket does not apply, resulting in both cases in a failure of establishing the session.

[Second Mode] Modification

The second mode is distinct from the first mode in a portion which relates to processings which utilize the key information IK. Accordingly, a modification described above in connection with the first mode is similarly possible in the second mode.

In the application server 600, the address collator 320*b* may be omitted, and when the key collator 620*a* confirms a matching, the ticket CK2 may be stored in the ticket memory means 330.

The key information IK is not limited to information relating to the public key of the user terminal. For example, where an authentication purpose shared secret key $K_{US}$ is shared beforehand between the user terminal 500 and the application server 600, information which can prove the possession of the authentication purpose shared secret key $K_{US}$ can be used. For example, as illustrated in a sequence diagram of FIG. 21A, upon a successful user authentication the authentication server 400 may generate a challenge b in a challenge generator 460 (FIG. 21B) and transmit it to the user terminal 500.

The user terminal 500, using a key information generator 503*a*' (FIG. 21C) in the authentication request means 503, calculates a value r of one-way hash function h for an input b and the authentication purpose shared secret key $K_{US}$, $r=h(K_{US}, b)$ as a response to b received, and generates a pair of the challenge b and the response r as key information IK={b, r}. This key information IK is transmitted to the authentication server 400. It is to be noted that as the challenge b, instead of a value which is explicitly transmitted from the authentication server 400, an implicit challenge such as a time (time stamp) when the response is generated or a sequence number in the session may be used, and in this instance, the transmission and the reception of the challenge can be omitted.

The authentication server 400 confirms the authenticity of the challenge b contained in the received key information IK, and when it could confirm properly, it issues a ticket CK2 containing the key information IK. The authenticity of the challenge can be confirmed in a manner such that if the challenge b is an explicit one or is uniquely determined in dependence upon the session between the user terminal 500 and the authentication server 400, a coincidence therebetween is confirmed or if the challenge b is an implicit challenge such as a time t1 when the response r is calculated, the authenticity is confirmed by a requirement that a difference between t1 and time t2 when the ticket is issued is within a permissible range d (namely, $t2-t1 \leqq d$). An authentication in terms of the challenge and the response using a shared secret key is known in the art, and therefore a detailed description will not be given.

When establishing a session for purpose of a service request, the user terminal 500 which has received the ticket CK2 transmits the ticket CK2 to the application server 600 in the manner mentioned above.

In the application server 600, a terminal authenticator 620*d* (FIG. 21D) is further provided in the ticket verifying means 620 which enters key information IK={b, r}, recalculates in a one-way hash calculator a hashed value $h(K_{US}, b)$ for the challenge b using the shared secret key $K_{US}$, and collates in a collation decision unit whether or not the hashed value coincides with the response r within the key information IK. If a result of the collation indicates a coincidence, a command is issued from the collation decision unit of the terminal authenticator 620*d* to the memory command unit 620*c* (FIG. 14) to permit a storage, whereby the ticket is stored.

Figure 21A:
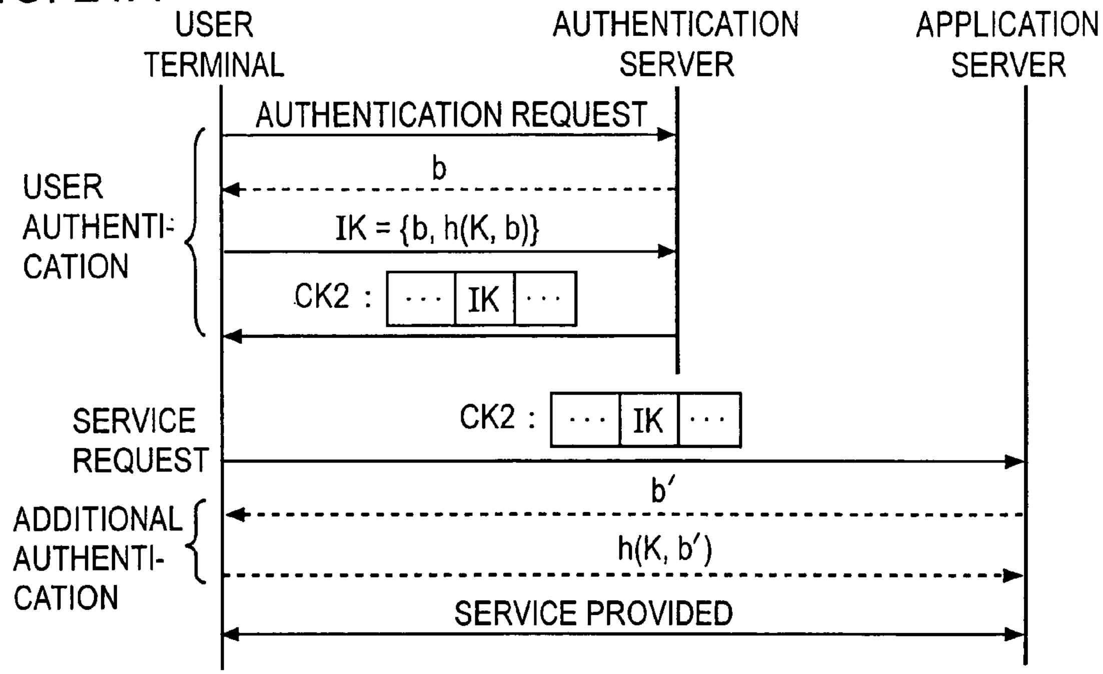
FIG. 21A is a sequence diagram showing an exemplary processing procedure in the authentication system when another example of key information is used.
Figure 21B:
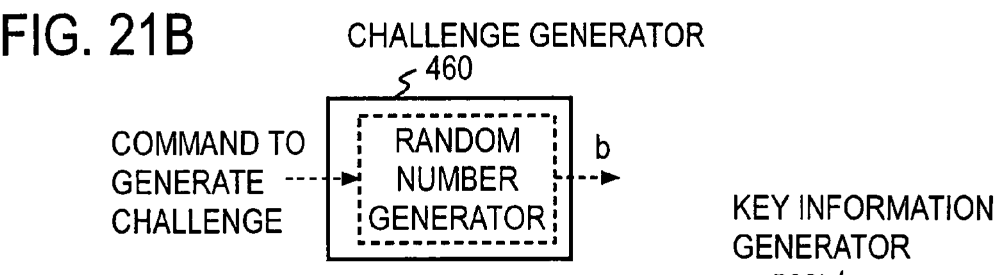
FIG. 21B is a block diagram showing a specific example of a challenge generator which is added to the authentication server shown in FIG. 12.
Figure 21C:
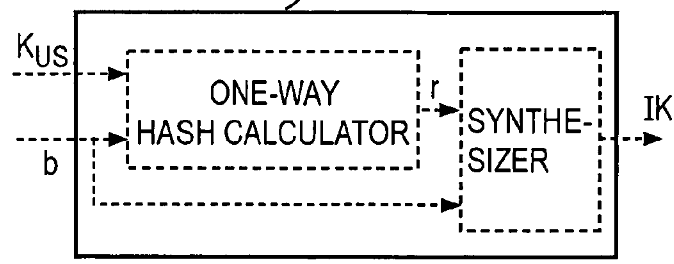
FIG. 21C is a block diagram showing another specific example of a key information generator shown in FIG. 13.
Figure 21D:
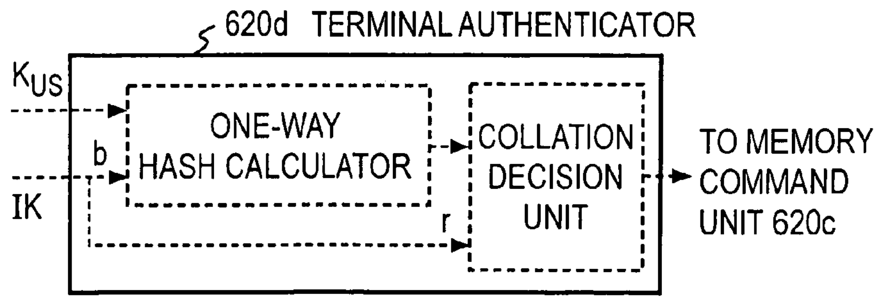
FIG. 21D is a block diagram showing a specific example of a modification within a ticket verifier means 620 shown in FIG. 14.

Alternatively, the terminal authenticator 620*d* (FIG. 21D) in the application server 600 may transmit an additional challenge b' in the process of establishing a session with the user terminal 500 to the user terminal, as indicated in broken lines in FIG. 21A, and receives a corresponding response $r'=h(K_{US}, b')$ from the user terminal 500 for confirming the authenticity of r'. (In this instance, b' may be replaced by an implicit challenge)

By the above procedure, by confirming that the response r (r') to the challenge b (b') which is session dependent information is proper on the basis of the key information IK, the application server 600 can recognize that the user terminal 100 has possessed the shared secret key $K_{US}$ at the time of the user authentication (and at the time of service request).

In addition, since the ticket CK2 is issued based on the user authentication, the correspondence between the key information IK, the address $A_U$ and the user identifier $ID_U$ is guaranteed and thus it can be guaranteed that the address $A_U$ has been issued to the user terminal having the shared secret key $K_{US}$ which is indicated by the key information. It can also be guaranteed that the service request which is made using the address $A_U$ as the source is from the authenticated user. Further, it can be related to ID, name and home address or the like of the authenticated user.

The key information IK may be information which relates to the public key $K_{PU}$ of the user terminal as indicated in the first example and may also be information which proves the possession of the authentication purpose shared secret key between the user terminal 500 and the application server 600. In sum, it may be the key information IK which enables the application server 600 to verify on the basis of the key information IK that the user terminal 500 possesses a private/secret key which enables the application server in general or the application server which received a service request to uniquely identify the user terminal 500, which is the private key $K_{SU}$ of the key pair of the user terminal for the former and which is the authentication purpose shared secret key $K_{US}$ for the latter.

The authentication servers shown in FIGS. 2 and 12, the user terminals shown in FIGS. 3 and 13 and the application servers shown in FIGS. 4 and 14 may be each functioned by a computer. By way of example, an authentication server program which causes a computer to function as an authentication server shown in FIG. 2 may be installed into the computer from a record medium such as CD-ROM, a magnetic disk, a semiconductor memory medium or the like or may be downloaded through a communication network to cause the computer to execute the server program. The same applies for other instances.

What is claimed is:

1. In an authentication system in which an authentication server which authenticates a user, a user terminal which transmits a user authentication information, and an application server which provides a service to the user through the user terminal are connected together to enable a communication therebetween through a network, the address based authentication system including:

the authentication server which comprises authentication means for authenticating a user based on the user authentication information transmitted together with a key information as an authentication request from the user terminal, the key information representing a public key $K_{PU}$ of the user terminal;

an address allocating means for allocating an address to the user terminal for a successful authentication of the user;

generating means for generating information-for-authentication using at least the allocated address;

a ticket issuing means for issuing a ticket containing the allocated address, the key information which is received from the user terminal and the information-for-authentication;

and a ticket transmitting means for transmitting the ticket issued by the ticket issuing means to the user terminal;

the user terminal which has a pair of the public key $K_{PU}$ and a private key $K_{SU}$ and comprises:

transmitting means for transmitting the user authentication information and the key information to the authentication server for purpose of an authentication request;

a ticket reception means for receiving the ticket which contains the allocated address, the key information and the information-for-authentication and which is transmitted from the authentication server;

means for setting up the allocated address contained in the ticket as a source address for each packet which is to be transmitted from the user terminal to the application server;

a first session key generating means for calculating a first session secret key which is shared with the application server, from the private key $K_{SU}$ of the user terminal and a public key $K_{PS}$ of the application server;

a packet cryptographic processing means for processing each packet to be transmitted to the application server by the first session secret key to guarantee that there is no forgery in each packet;

means for transmitting a first packet including the ticket to the application server for establishing a session; and a service request means for transmitting a second packet requesting the service to the application server through the session;

and the application server which has a pair of the public key $K_{PS}$ and a private key $K_{SS}$ and comprises:

a second session key generating means for calculating a second session secret key which is shared with the user terminal, from the private key $K_{SS}$ of the application server and the public key $K_{PU}$ of the user terminal;

a packet verifying means for confirming whether or not each packet received from the user terminal is forged using the second session secret key;

a ticket memory means for storing the ticket transmitted from the user terminal;

ticket verifying means for verifying the presence or absence of any forgery in the information-for-authentication in the ticket transmitted from the user terminal to determine if the allocated address contained in the ticket is forged or not and preventing the ticket from being stored in the ticket memory means in the presence of a forgery and further verifying whether or not the key information contained in the ticket in the first packet, which has been verified as not being forged, is the key information representing the public key $K_{PU}$ of the user terminal, and if not, prevent the ticket from being stored in the ticket memory means;

an address comparison means for determining whether or not the allocated address contained in the ticket which is stored in the ticket memory means coincides with the source address of the second packet which is transmitted from the user terminal through the session; and a service providing means for transmitting to the user terminal packets which provide the service to the user when a coincidence between the addresses is determined by the address comparison means.

2. The authentication system according to claim 1 the application server further comprising an address collating means for collating the allocated address in the ticket transmitted from the user terminal against the source address of the first packet which includes the ticket and for preventing the ticket from being stored in the ticket memory means if a coincidence is not found.

3. The authentication system according to claim 1 in which the authentication server comprises a user identifier allocating means for allocating a user identifier which corresponds to the authenticated user in response to the authentication request for a successful authentication of the user, the ticket issuing means being configured to issue the ticket inclusive of the user identifier.

4. The authentication system according claim 1 in which the authentication information generating means of the authentication server is configured to process the information including the allocated address with a shared secret key which is shared beforehand between the authentication server and the application server, the ticket verifying means of the application server is configured to further verify the information-for-authentication contained in the ticket using a shared secret key which is beforehand shared between the authentication server and the application server.

5. The system according to claim 1, in which the authentication server has a secret key and a public key for a digital signature, and said ticket issuing means comprises:

an authentication information generating means for computing a digital signature on the information including at least the allocated address using the secret key for the digital signature to produce the information for authentication so that the application server can verify the presence or absence of any forgery in the information for authentication in the ticket using the public key of the authentication server.

6. An application server in an authentication system in which an authentication of a user utilizing a user terminal is performed by an authentication server and a request to provide a service is made to an application server on the basis of the authentication, comprising a session establishing means for establishing a session with a user terminal in response to a reception of a session establishment request packet containing a ticket from the user terminal, said ticket containing an address allocated by the authentication server to the user terminal, a key information representing a public key $K_{PU}$ of the user terminal and information-for-authentication generated by the authentication server using at least the allocated address;

a ticket memory means in which the ticket transmitted from the user terminal is stored;

an address comparison means to which a source address of a service request packet which is transmitted from the user terminal and received through the established session is input and which determines whether or not the source address coincides with an allocated address of the user terminal contained in the ticket stored in the ticket memory means; and a service providing means which provides a service to the user terminal when the output of the address comparison means indicates a coincidence, wherein said session establishing means comprises a ticket verifying means for verifying authenticity of the ticket, which is received from the user terminal for establishing the session, by checking the information-for-authentication contained in the ticket to determine if the allocated address contained in the ticket is forged or not and preventing the ticket from being stored in the ticket memory means when verification is not successful, and further verifying whether or not the key information contained in the ticket in the first packet, which has been verified as not being forged, is the key information representing the public key $K_{PU}$ of the user terminal, and if not, prevent the ticket from being stored in the ticket memory means.

7. The application server according to claim 6, further comprising a session key generating means for calculating a session secret key which is shared with the user terminal from a private key of the application server and a public key of the user terminal;

and a packet verifying means for verifying whether or not the session establishment request packet received from the user terminal is forged using the session secret key and for preventing the ticket from being stored in response to a verification output indicating the presence of a forgery.

8. The application server according to claim 7 in which the ticket verifying means comprises collating means for verifying, when the received session establishment request packet has been verified by the packet verifying means as not forged, whether or not key information contained in the ticket corresponds to the public key of the user terminal which has been used in the calculation of the session secret key.

9. The application server according to claim 6 in which the ticket verifying means comprises terminal authenticating means to which an authentication purpose shared secret key which is shared with the user terminal and a random number which changes each time a session is established are input and which processes the random number using the authentication purpose shared secret key, collates a result of the processing against a key information in the ticket and verifies the authenticity of the ticket by seeing whether or not a matching between the result of processing and the key information applies.

10. An application server according to claim 6 in which the ticket verifying means comprises means for verifying whether or not the source address of the received session establishment request packet coincides with the allocated address contained in the ticket within the session establishment request packet and for preventing the ticket from being stored in response to a detection output which indicates a non-coincidence.

11. A non-transitory computer readable storage medium having stored thereon an application server program for programming a computer to function as an application server in an authentication system in which an authentication of a user utilizing a user terminal is performed by an authentication server and a request to provide a service is made by the user terminal to the application server on the basis of the authentication, the application server comprising:

a session establishing means for establishing a session with a user terminal in response to a reception of a session establishment request packet containing a ticket from the user terminal, said ticket containing an address allocated by the authentication server to the user terminal, a key information representing a public key $K_{PU}$ of the user terminal and information-for-authentication generated by the authentication server using at least the allocated address;

a ticket memory means in which the ticket transmitted from the user terminal is stored;

an address comparison means to which a source address of a service request packet which is transmitted from the user terminal and received through the established session is input and which determines whether or not the source address coincides with an allocated address of the user terminal contained in the ticket stored in the ticket memory means; and a service providing means which provides a service to the user terminal when the output of the address comparison means indicates a coincidence, wherein said session establishing means comprises a ticket verifying means for verifying authenticity of the ticket, which is received from the user terminal for establishing the session, by checking the information-for-authentication contained in the ticket to determine if the allocated address contained in the ticket is forged or not and preventing the ticket from being stored in the ticket memory means when verification is not successful and further verifying whether or not the key information contained in the ticket in the first packet, which has been verified as not being forged, is the key information representing the public key $K_{PU}$ of the user terminal, and if not, prevent the ticket from being stored in the ticket memory means.

* * * * *